US012703228B2

(12) United States Patent
Chen et al.

(10) Patent No.: US 12,703,228 B2
(45) Date of Patent: Aug. 11, 2026

(54) ADAPTIVE SELF-HEATING MANAGEMENT OF PROCESSORS IN AUTONOMOUS VEHICLES

(71) Applicant: GM Cruise Holdings LLC, San Francisco, CA (US)

(72) Inventors: Fen Chen, Morgan Hill, CA (US); Jagdeep Singh, Union City, CA (US); Andrew Liang, San Francisco, CA (US); Louis Alexander Pisha, Oakland, CA (US); Arul Ramalingam, Fremont, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 244 days.

(21) Appl. No.: 18/404,540

(22) Filed: Jan. 4, 2024

(65) Prior Publication Data

US 2025/0222746 A1 Jul. 10, 2025

(51) Int. Cl.
*B60H 1/32* (2006.01)
*B60W 60/00* (2020.01)

(52) U.S. Cl.
CPC ....... *B60H 1/32* (2013.01); *B60H 2001/3255* (2013.01); *B60W 60/001* (2020.02)

(58) Field of Classification Search
CPC .... B60H 1/32; G06F 11/3058; B60G 2400/70
See application file for complete search history.

(56) References Cited

U.S. PATENT DOCUMENTS 10,926,603 B2 * 2/2021 Awad Alla .............. G06F 1/206
10,948,955 B2 * 3/2021 Cher ........................ G01K 7/42
11,897,509 B2 * 2/2024 Lohmeyer ......... B60W 60/0015
12,223,438 B2 * 2/2025 Singh ..................... G06N 20/00
12,449,150 B1 * 10/2025 Wang ....................... F24F 11/63
2009/0271049 A1 * 10/2009 Kinney ................... G06F 1/206 706/46
2009/0299543 A1 * 12/2009 Cox ........................ G06F 1/206 713/300

(Continued)

FOREIGN PATENT DOCUMENTS

CN 113692535 A * 11/2021 .............. G06N 5/01

*Primary Examiner* — Nelson J Nieves
(74) *Attorney, Agent, or Firm* — CANTOR COLBURN LLP

(57) ABSTRACT

Autonomous vehicles (AVs) may have processors to perform compute operations. These processors may be susceptible to overheating, due to one or more mechanical failures that may occur in the assembly that encloses the processors. To proactively address potential overheating of these processors, temperature of the processors can be monitored over time, e.g., at launch and during AV operation. A temperature profile line can be fitted to envelop the temperature data samples. The temperature profile line can indicate an extent of overheating, the rate of regression of the assembly's ability to cool the processors and predict when the processor may reach a critical temperature in the future. Based on one or more parameters that define the temperature profile line, it is possible to determine a regression profile of the processor. The regression profile can dictate whether to take an action to compensate for the regression.

18 Claims, 13 Drawing Sheets

(56) References Cited

U.S. PATENT DOCUMENTS

| | | | | |
|---|---|---|---|---|
| 2011/0301777 | A1* | 12/2011 | Cox | G06F 1/3203 713/300 |
| 2016/0065067 | A1* | 3/2016 | Isham | G01K 13/00 323/271 |
| 2017/0261380 | A1* | 9/2017 | Cher | G06F 1/206 |
| 2018/0314248 | A1* | 11/2018 | Dudar | G07C 5/0808 |
| 2019/0137131 | A1* | 5/2019 | Sako | F24F 11/47 |
| 2020/0225985 | A1* | 7/2020 | Hayashidera | G06F 9/4881 |
| 2022/0208297 | A1* | 6/2022 | Johnson | G06N 5/01 |
| 2022/0392279 | A1* | 12/2022 | Khan | G07C 5/0808 |
| 2023/0103173 | A1* | 3/2023 | Androulakis | G06N 3/09 701/36 |
| 2023/0167996 | A1* | 6/2023 | Fuhrmann | F24F 11/65 |
| 2025/0181934 | A1* | 6/2025 | Bahulkar | G06F 11/3062 |

* cited by examiner

ADAPTIVE SELF-HEATING MANAGEMENT OF PROCESSORS IN AUTONOMOUS VEHICLES

TECHNICAL FIELD

The present disclosure generally relates to heating control of computer systems, and, more specifically, to adaptive self-heating management of high-power processor chips used in autonomous vehicles (AVs).

BACKGROUND

AVs also known as self-driving cars, and driverless vehicles, may be vehicles that use multiple sensors to sense the environment and move without human input. Automation technology in AVs may enable vehicles to drive on roadways and to perceive the vehicle's environment accurately and quickly, including obstacles, signs, and traffic lights. Autonomous technology may utilize geographical information and semantic objects (such as parking spots, lane boundaries, intersections, crosswalks, stop signs, and traffic lights) for facilitating vehicles in making driving decisions. The vehicles can be used to pick-up passengers and drive the passengers to selected destinations. The vehicles can also be used to pick-up packages and/or other goods and deliver the packages and/or goods to selected destinations.

BRIEF DESCRIPTION OF THE DRAWINGS

The various advantages and features of the present technology will become apparent by reference to specific implementations illustrated in the appended drawings. A person of ordinary skill in the art will understand that these drawings show only some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
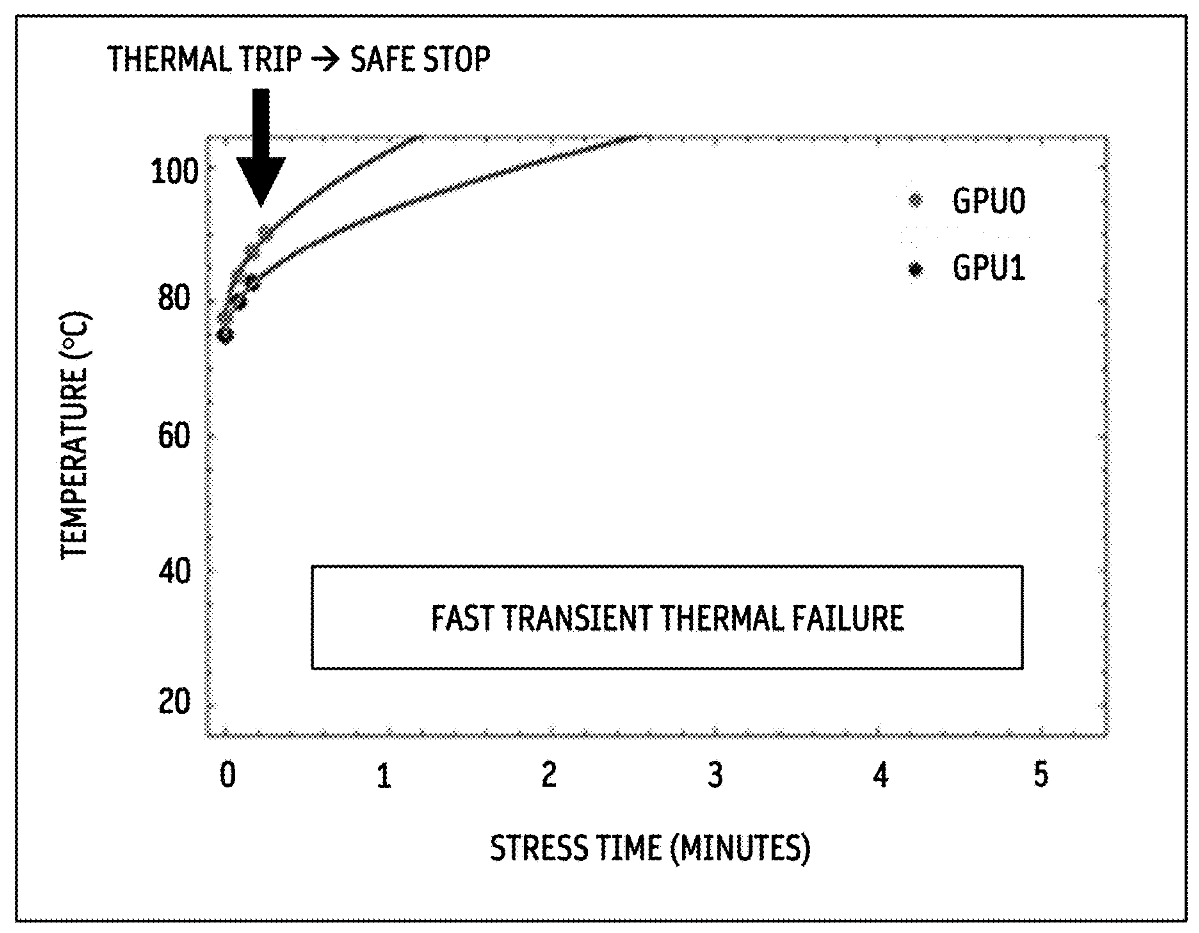
FIG. 1 depicts an exemplary plot of stress time versus temperature illustrating a fast transient thermal failure, according to some aspects of the disclosed technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details that provide a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Overview

An AV is able to perceive their surroundings, understand scenes, generate plans for the AV, and control the AV, so that the AV can navigate about its surroundings autonomously or semi-autonomously. The software and/or hardware components that perform perception, understanding, planning, and/or controls may be collectively called the AV stack. AVs may be provided with one or more processors to perform compute operations that enable the AV to move its surroundings without colliding with other objects, follow rules of the road, and offer safe, comfortable, and efficient transportation. The processors provided on an AV may include one or more of: a central processing unit (CPU), a graphical processing unit (GPU), a quantum processor, a machine learning processor, an artificial intelligence processor, a neural network processor, an artificial intelligence accelerator, an application specific integrated circuit (ASIC), an analog signal processor, an analog computer, a microprocessor, a digital signal processor, a field programmable gate array (FPGA), a tensor processing unit (TPU), a data processing unit (DPU), etc. These processors are high-power chips, or high-power integrated circuits that can heat up quickly during operation. Mechanical thermal cooling systems, e.g., air-cooling systems, liquid-cooling systems, cold plate heat dissipation systems, metal fins, etc., may be included in an assembly that encloses these processors to remove heat from these processors.

In some AVs, the mechanical thermal cooling systems may be triggered to turn up cooling (e.g., spin a fan faster) if the temperature of the processor exceeds a temperature threshold. In some AVs, the mechanical thermal cooling system uses no thresholds at all (e.g., smoothly increasing the amount of cooling based on the amount of heating). In some AVs, the mechanical thermal cooling systems may gradually or smoothly increase coolant flow rate based on the temperature of the processor or lower the coolant temperature by starving heating, ventilation, and air conditioning (HVAC). Such mechanisms can be reactive, and at best may offer a crude mechanism to address heating issues. Such mechanisms may not always prevent eventual thermal runaway issues of these processors. Such mechanisms lack the ability to spot early signs of overheating and predict when the processor may run into a thermal runaway issue. Some mechanisms may require extra power consumption.

These processors in AVs may be susceptible to overheating considering their high-power ratings required by high performance demands. The processors overheating to a critical temperature may lead to a thermal trip event, which may cause an AV to gracefully shut down and come to a safe stop. In some cases, the processors may be damaged from the overheating and may have to be replaced. The processors are expensive, and thus are costly to replace. Inspection of the processors for servicing can be difficult, because the disassembly of the assembly that encloses the processors is cumbersome, messy, and in some cases destructive to the processors if not performed carefully.

Even with mechanical thermal cooling systems, these processors may still overheat due to one or more mechanical failures that may occur in the assembly that encloses the processors. Thermo-mechanical stresses such as torsion and shear may cause the mechanical thermal cooling systems to fail or not operate optimally. Movement of the AVs while the AV is driving around on roads may exacerbate the mechanical stresses that the assembly and the processor experience. Potential causes for or factors associated with the thermo-mechanical stresses may include: (1) the deformation or twisting of a printed circuit board caused by assembly process could generate torsion, shear, and tensile stresses, (2) printed circuit board deformation or twisting arising from thermal expansion, which may be exacerbated by excessive restraint from cold plate mountings, (3) thermal expansion driven by fluctuations in coolant temperature and self-heating of the processors due to workload on the processors, and (4) backplate of the processors may transmit strain from the printed circuit board to a front thermal conduction path of the processors.

Therefore, a different and improved cooling approach may be implemented to anticipate, detect, and mitigate overheating. This is in contrast to some other mechanical thermal cooling systems where the systems may merely increase the amount of cooling applied as the processor temperature increases. Such systems can make three assumptions, which may not always hold true in the AV context. First, such systems assume that increased temperature is caused by temporary factors such as increased compute workload on the processor and environmental temperature, rather than by mechanical stresses or impending failures. Second, such systems assume that the cooling system would always be able to provide adequate cooling to the processor. Such systems may assume that the maximum power which the cooling system is capable of removing from the processor is greater than or equal to the maximum power the processor can dissipate. Third, such systems assume that any steady-state temperature jointly reached by the processor and cooling system is acceptable for the processor to run indefinitely without damaging the processor or related hardware. Because one or more of these assumptions may not always be true in the AV context, the design of mechanical thermal cooling systems may not be adequate.

To proactively address potential overheating of a processor while the AV is operating in the field (e.g., AV is driving on the roadways) and address one or more of the concerns discussed above, temperature of the processor can be monitored over a period of time, e.g., at AV stack launch (e.g., when the AV system starts or restarts) and during AV operation (e.g., while the AV is on the road, potentially completing an operational assignment). The temperature data samples being tracked over the period of time may enable repeated assessments of thermal stability regression of the processor, and/or repeated determinations and updates of the regression profile of the processor. The thermal stability regression of the processor can be analyzed and monitored in real-time.

Note that temperature increasing for a processor can indicate two different situations: (1) normal, acceptable behavior due to increased workload or increased environmental temperatures, or (2) thermal stability regression of the processor caused by degradation in mechanical thermal cooling systems. The second scenario (unacceptable or anomalous thermal stability regression) can lead to a possible future failure or overheating event. One technical challenge being addressed by the thermal stability regression monitoring techniques described herein is to be able to distinguish between these two scenarios using information gathered or derived from the repeated assessments of thermal stability regression and/or repeated determinations and updates of the regression profile of the processor.

Assessments of thermal stability regression and regression profiling are distinct from and are an improvement over solutions that involve a crude temperature threshold check, or a gradual increase in the amount of cooling in response to an increase in the temperature of the processor. Using temperature data samples collected from AV stack launch, a temperature profile line can be fitted to envelop the temperature data samples (e.g., capturing worse-case temperature data samples, thus capturing worse-case temperature regression). The temperature profile line can indicate, one or more of: an extent of overheating, an extent of self-heating of the processor, the rate of regression of the assembly's ability to cool the processors, and when the processors may be predicted to reach a critical temperature in the future. Based on one or more parameters that define the temperature profile line, it is possible to determine a regression profile of the processor, e.g., select a regression profile from a plurality of possible regression profiles. The regression profile can dictate whether to take an action to compensate for the regression.

In some cases, the regression profile can indicate that the processor is in a good state (e.g., the processor is heating up normally and has margin to handle more workload). No action may be warranted to compensate for the regression. In some cases, an action may be taken to increase the workload on the processor.

In some cases, the regression profile can indicate that the regression rate is too high, the processor may be heating up faster than a desirable rate (i.e., heating is more than cooling provided by the cold plate), and/or indicate that the processor is predicted to reach a critical temperature soon. One or more compensation actions can be taken to address and/or regulate the temperature of the processor. Examples of compensation actions may include:

Changing a loading/utilization profile of the processor,

Changing a clock frequency of the processor,

Changing the voltage level setting or power level setting of the processor,

Causing the AV to drive a different route that has fewer tracked objects in the scene, Causing the AV to drive a different route that has fewer complex scenes (e.g., less populated area, less congested roads, areas with fewer objects, etc.), Causing the AV to drive a different route with a lower speed limit (e.g., reducing a size of a detection range of the sensors), Causing the AV to drive more slowly or reduce the maximum speed of the AV, Causing the AV to drive a different route which involves lower environmental temperatures (e.g. shady vs. sunny, near a body of water), Redeploying a vehicle to a different city or place with lower average environmental temperatures, Adjusting a vehicle cooling system setting, Adjusting a processor cooling system setting, Causing the AV to enter a degraded state of operation, Waiting for the AV to complete a current operational assignment, then changing the AV to follow a revised route, and Waiting for the AV to complete a current operational assignment (e.g., drop-off a passenger), then causing the vehicle cooling system to direct cooling from the cabin of the AV to the assembly enclosing the processor.

The regression profile may be updated repeatedly to determine whether additional compensation action(s) may be needed to further regulate the temperature of the processor.

Information about the temperature regression of the processor (e.g., including one or more parameter(s) of the temperature profile line, the regression profile, and one or more compensation actions taken) can be transmitted to a fleet management system. The fleet management system may collect the information from a fleet of AV, to make more informed decisions about operational assignments of the AV fleet.

The approach may have one or more advantages. The approach can implement an effective, selective, and dynamic management and regulation of temperature for high-power chips to prevent overheating. The approach can not only assess the regression profile at a given point in time, but the approach can also predict temperature regression in the future. The regression profile can offer nuanced, fine-grained information that can better inform which compensation action to take. The regression profile can help distinguish between normal heating of the processor versus abnormal heating of the processor potentially caused by degradation in mechanical thermal cooling systems. Adjusting the processor's loading profile and/or clock frequencies may actively prevent additional self-heating, prioritize safety considerations, while optimizing performance of the processor. The approach can ensure the processor can operate reliably while maximizing performance and lifetime of the processor. The approach can be universally applied to a variety of high-power chips or integrated circuits used in mission critical applications including AVs.

The approach can enable more effective monitoring of an AV fleet, when real-time time data across the fleet is available. The fleet management system can screen and categorize the vehicles in the AV fleet based on regression profiles. Equipped with fleet-level information, the fleet management system can make better decisions on organizing the AV fleet and their operational assignments. The approach can proactively trigger maintenance actions for vehicles in AV fleet and reduce the likelihood of more severe safety and reliability issues occurring with the vehicles. The approach can ensure dependable AV operations, even when AVs are operating in diverse environmental scenarios.

Various embodiments herein and their advantages may apply to a wide range of vehicles that may have processors susceptible to overheating (e.g., semi-autonomous vehicles, vehicles with driver-assist functionalities, etc.), and not just AVs. Vehicles can include automobiles, buses, trucks, utility vehicles, construction/heavy machinery, ships, planes, helicopters, drones, trains, submarines, etc.

Understanding Failures that May Impact Temperature Regulation of Processors Operating in AVs One or more processors, such as CPUs, GPUs, FPGAs, TPUs, and DPUs, may be used in an AV as part of an AV stack to perform compute operations relating to such as sensor data processing, machine learning models, path searching/planning, etc. In a data center, these processors do not experience the same amount of thermo-mechanical stresses, and mechanical thermal cooling systems can usually regulate the temperature of the processors well. In addition, component compliance and process tolerances for assemblies that enclose processors used in data centers may be sufficient in accounting for the small amount of thermo-mechanical stresses that may be present in a data center. In an AV, the thermo-mechanical stresses can be much higher due to its unique outdoor temperature mission profile, and component compliance and process tolerances may not be sufficient in accounting for larger amount of thermo-mechanical stresses. In addition, cooling hardware in AVs may be different or have less cooling capabilities than the cooling hardware in data centers. Therefore, a processor in an AV can encounter thermal trip events, where the temperature of a processor may reach a critical temperature (e.g., where the processor may get too hot). When a thermal trip event occurs, the processor may be shut down and may cause the vehicle to gracefully reach a safe stop. A critical temperature may be set at a temperature where the processor does not get damaged from overheating but may risk overheating if the processor is not shut down immediately. The vehicle may be stopped, may not be able to complete a current operational assignment, and may need to be towed to a service facility for inspection. While the failure rate is not 100%, failures can occur on occasion (e.g., 10% of the time). When thermal trip events occur, they can significantly impact the operation of the AV.

FIG. 1 depicts an exemplary plot of stress time versus temperature illustrating a fast transient thermal failure, according to some aspects of the disclosed technology. In some cases, a thermal trip event occurs due to a fast transient thermal failure. The temperature of the processor can reach a critical temperature within seconds to a minute upon AV stack launch. For example, processor "GPU0" may experience a thermal trip event in less than a minute.

Figure 2:
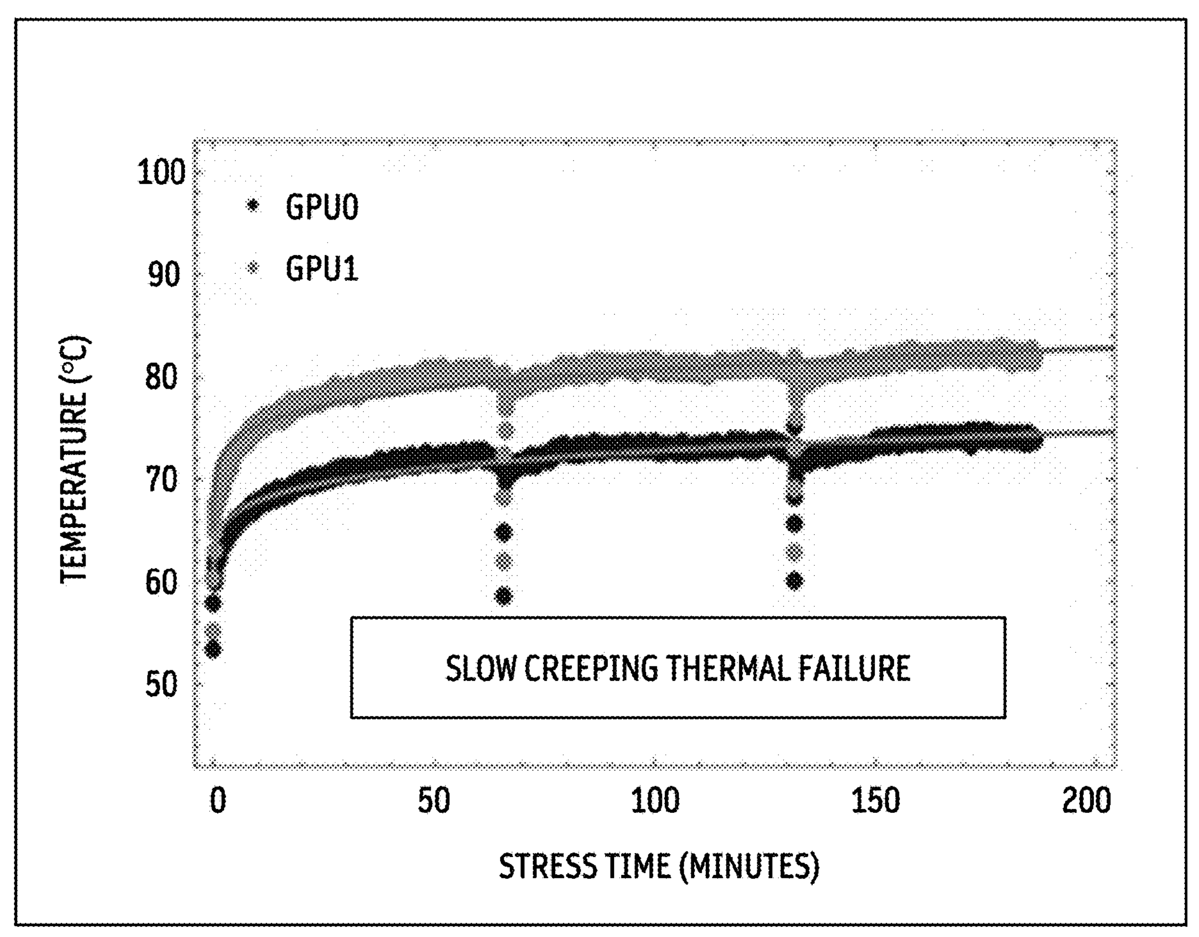
FIG. 2 depicts an exemplary plot of stress time versus temperature illustrating a slow creeping thermal failure, according to some aspects of the disclosed technology.

FIG. 2 depicts an exemplary plot of stress time versus temperature illustrating a slow creeping thermal failure, according to some aspects of the disclosed technology. In some cases, a thermal trip event due to a slow creeping thermal failure, where the temperature of the processor can slowly increase over time (e.g., over an hour or more). The temperature may eventually reach a critical temperature in a few hours after AV stack launch. For example, processor "GPU1" may eventually experience a thermal trip event after hundreds of hours of operation.

Figure 3:
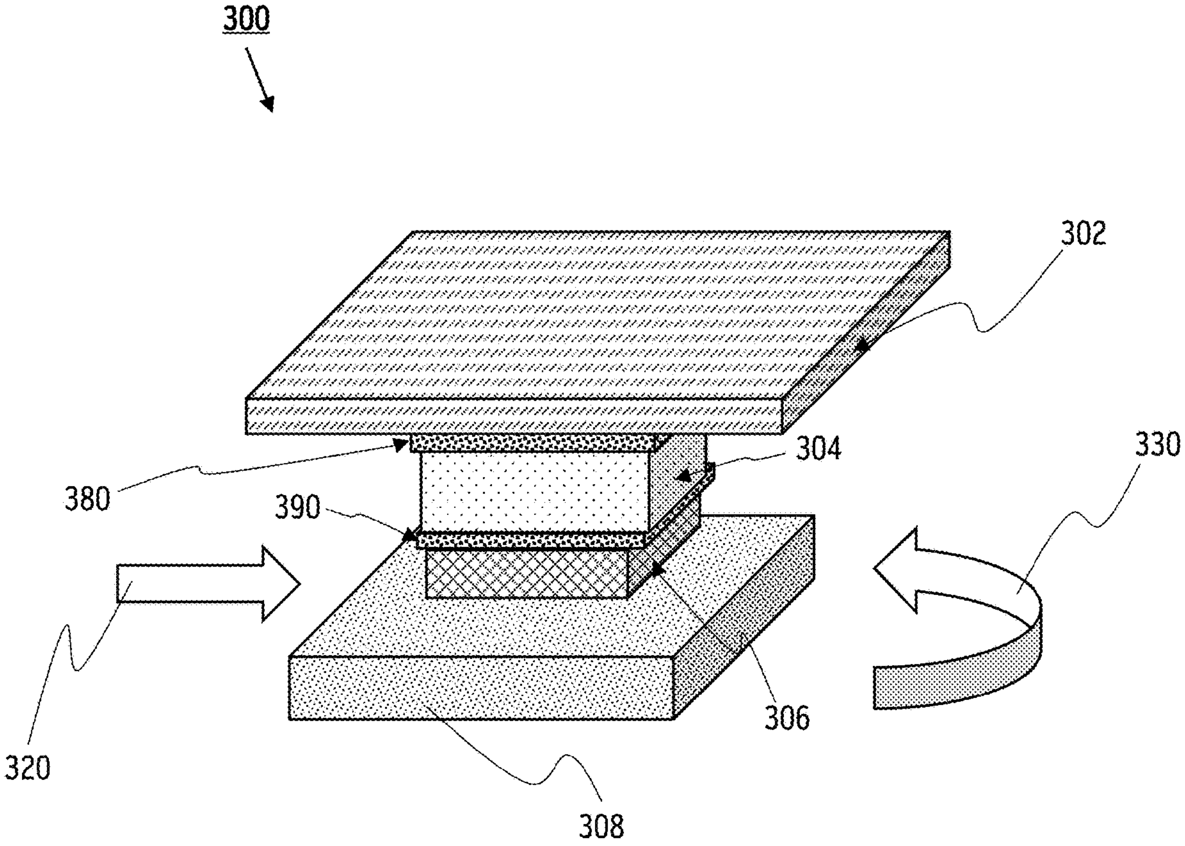
FIG. 3 illustrates a structure of an assembly that encloses a processor, according to some aspects of the disclosed technology.

FIG. 3 illustrates a structure 300 of an assembly that encloses a processor 306, according to some aspects of the disclosed technology. Exemplary structure 300 illustrates the various components which may be stacked together within the assembly that encloses processor 306. The components of the structure 300 may include cold plate 302, thermal interface material (TIM) A 380, heat spreader 304, TIM B 390, processor 306, and printed circuit board 308, stacked in the order and manner as shown. Structure 300 may include additional components not shown (e.g., an additional heat spreader layer or heat pipes). Printed circuit board 308 offers a base structure to which processor 306 is mounted. A first side of processor 306 interfaces with printed circuit board 308. TIM A 380 and TIM B 390 can include a silicone-based thermal grease or paste with metal oxide, silver or graphite fillers. TIM A 380 and TIM B 390 can fill in microscopic air gaps on surfaces where TIM A 380 and TIM B 390 are applied to ensure better thermal contact and more efficient heat transfer. A second side of processor 306 interfaces with a first side of heat spreader 304 through TIM B 390. TIM B 390 can improve heat transfer between processor 306 and heat spreader 304. Heat spreader 304 may carry heat away from processor 306 towards cold plate 302 to lower and/or regulate temperature of processor 306. Heat spreader 304 may facilitate dissipation of heat from processor 306 to cold plate 302. Heat spreader 304 may include materials with high thermal conductivity like copper, aluminum, graphite, or diamond. A second side of heat spreader 304 interfaces with cold plate 302 through TIM A 380.

The structure 300 can have a variety of interfaces, e.g., an interface between cold plate 302 and heat spreader 304 (e.g., TIM A 380), and an interface between the heat spreader 304 and processor 306 (e.g., TIM B 390). Proper heat regulation may depend on the integrity of the interfaces in structure 300, such as TIM A 380 and TIM B 390, and their ability to conduct heat away from processor 306 and provide good thermal contact at the interfaces.

During operation of an AV having structure 300, processor 306 may be performing compute operations that can cause processor 306 to heat up. When processor 306 heats up, a torsion/tensile/shear loading on the interfaces can be generated. For example, board deformation or twist can be caused by thermal expansion from processor 306 heating up, and coolant temperature, and over-restraint from cold plate mountings can exacerbate board deformation or twist. Board deformation or twist could induce a torsion, shear, and tensile load on the interfaces. Arrow 320 illustrates shear loading on interfaces in the structure 300. Arrow 330 illustrates torsion loading on the interfaces in structure 300. Strain on the board can transfer to the interfaces via processor 306 and can damage TIM B 390 between processor 306 and heat spreader 304, and/or TIM A 380 between cold plate 302 and heat spreader 304. When structural integrity is lost at the TIM interfaces, e.g., TIM A 380 and TIM B 390, due to various mechanical stresses, the ability for the structure 300 to regulate the temperature of processor 306 goes down significantly.

In some cases, the assembly may enclose multiple processors on printed circuit board 308. Each processor may have corresponding thermal interfaces similar to the ones described and illustrated in structure 300. The amount of self-heating of different processors may differ at any given point in time (e.g., since one processor may be performing more compute operations and generate more heat than another processor at a point in time) and cause different rates of thermal expansion in the assembly. The diverse thermal expansion activity on the printed circuit board 308 may add further board deformation or twist, which may induce further torsion, shear, and tensile load on the interfaces for the different processors.

Some mitigation efforts can be implemented to address these loads. Examples may include better printed circuit board strain engineering, better heat spreader material, improved TIM adhesion, improved TIM thermal conductivity, improved TIM compliance property, improved stack-up tolerance optimization, spring load heat spreader, etc. Other examples may include lowering coolant temperature used for cooling the processor, increasing pump flow rate of the coolant flowing over the processor to carry more heat more quickly, optimizing coolant composition to carry heat more effectively, etc. However, these efforts may have limits, and cannot prevent thermal runaway issues completely.

Complementary Approach Through Monitoring of Temperature Regression and Reducing Self-Heating Directly To address limitations of mitigation efforts, a complementary approach to addressing overheating of processors can be implemented. The complementary approach may address overheating through software-based procedures to regulate the temperature of the processor. The complementary approach can be used side-by-side with other mitigation efforts and/or replace or reduce some of the mitigation efforts. When used side-by-side with mitigation efforts, the resulting system may have synergistic results that may not be achievable when mitigation efforts and the software-based approach are performed separately.

One part of the complementary approach is to perform compensation actions that can regulate the temperature of a processor, e.g., to cause the processor to produce less heat. Examples of compensation actions are described and illustrated through FIGS. 4-6 and 9.

Another part of the complementary approach is to monitor and characterize temperature trends and temperature regression of processors in a more nuanced, fine-grained manner. Trends can be used to predict potential overheating issues in the future and when they may occur. As compensation action(s) are performed, temperature regression may be reassessed. Trends and regression can also be reported to a fleet management system such that fleet-level compensation actions can be determined and triggered. Monitoring temperature and temperature regression techniques are described and illustrated through FIGS. 7-11.

How Self-Heating of a Processor can Change

One insight behind the complementary approach is to tackle the root cause for processor self-heating. Processors can heat up because the processor is performing heavy amounts of compute operations, using a high amount of power, and dissipating large amount of heat. The complementary approach may include performing one or more compensation actions which reduces the amount of compute operations or the amount of power being used by the processor.

Figure 4:
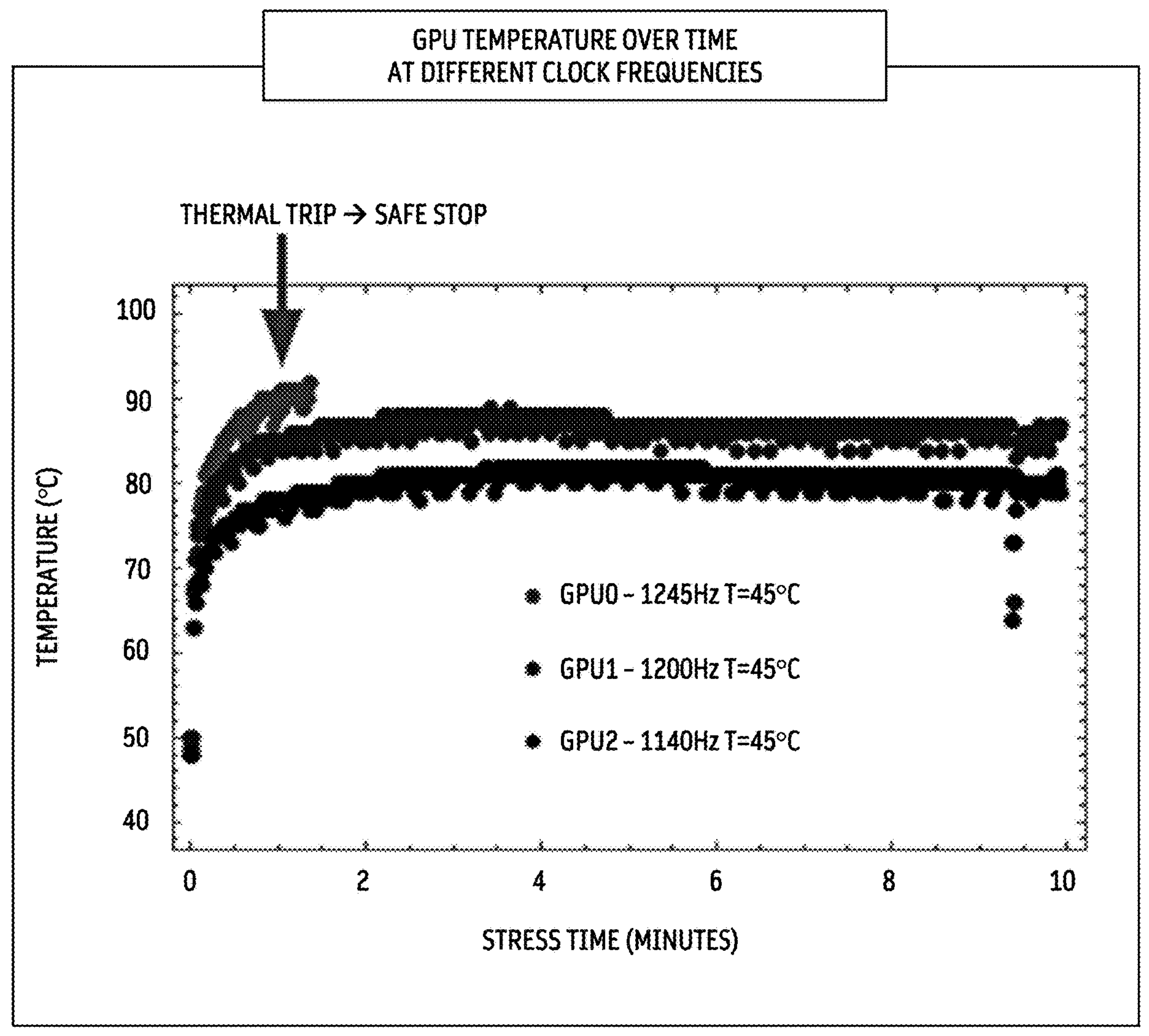
FIG. 4 illustrates different temperature trends of processors running at different clock frequencies, according to some aspects of the disclosed technology.

FIG. 4 illustrates different temperature trends of processors running at different clock frequencies, according to some aspects of the disclosed technology. The plot in FIG. 4 illustrates a first temperature trend of a first processor "GPU0" running at 1245 Hz, a second temperature trend of a second processor "GPU1" running at 1200 Hz, and a third temperature trend of a third processor "GPU2" running at 1140 Hz. The first temperature trend exhibits a fast transient thermal failure as illustrated in FIG. 1. The first processor experiences a thermal trip event in less than two minutes. The temperature of the first processor rises more quickly than the temperatures of the second processor and the third processor. The second temperature trend exhibits a slow creeping thermal failure as illustrated in FIG. 2. The second processor may experience a thermal trip event at a later time. The shapes of the trends are different for the different processors running at different clock frequencies. When a processor runs at a higher clock frequency, more compute operations can be performed within a certain period of time, than a processor running a lower clock frequency. Temperature tends to rise more quickly for processors running at a higher clock frequency than processors running at a lower clock frequency.

Figure 5:
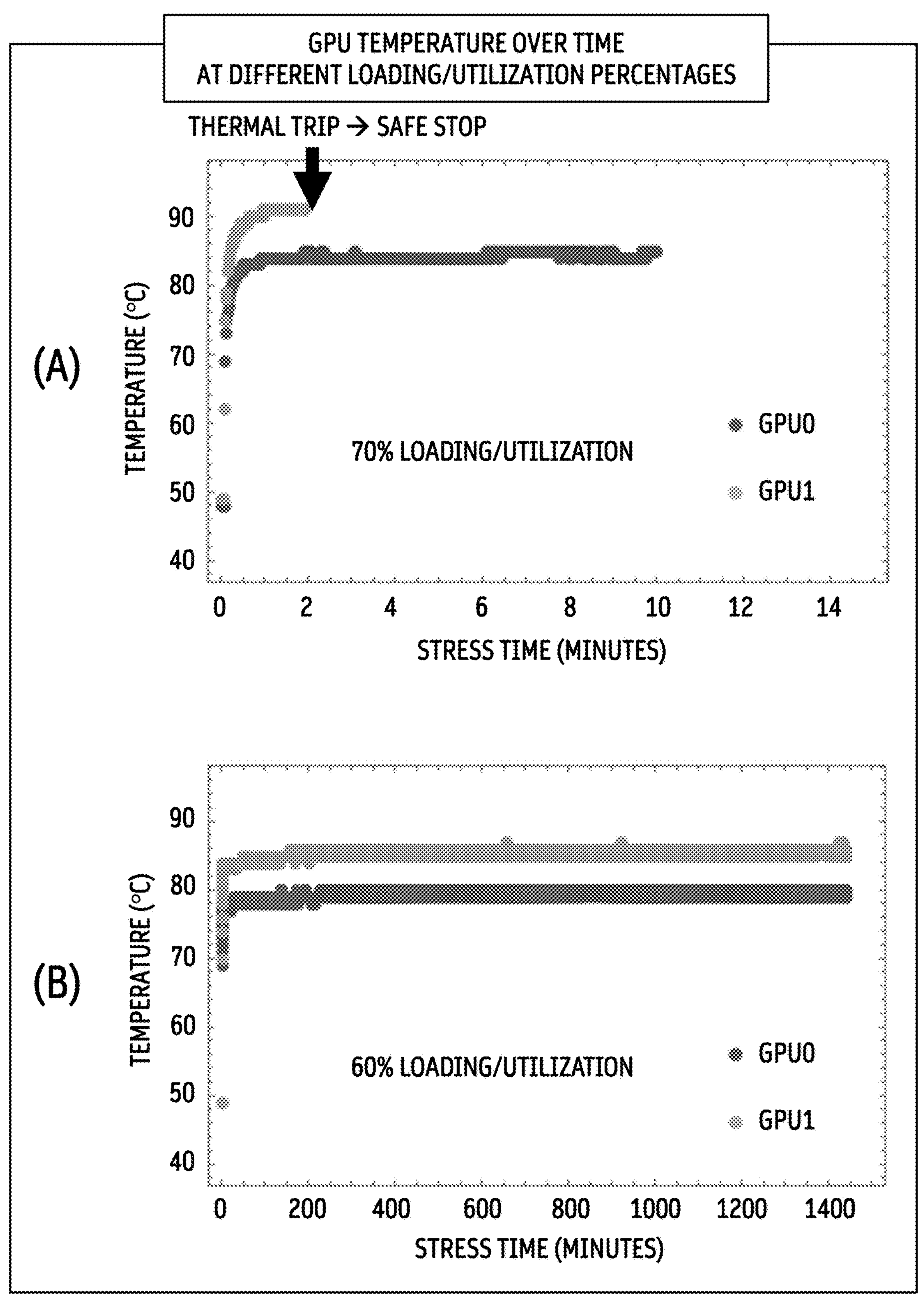
FIG. 5 illustrates different temperature trends of processors running with different loading or utilization profiles, according to some aspects of the disclosed technology.

FIG. 5 illustrates different temperature trends of processors running with different loading or utilization profiles, according to some aspects of the disclosed technology. Plot (A) in FIG. 5 illustrates a first temperature trend of a first processor "GPU0" running at 70% loading/utilization (e.g., set to run with a 70% loading/utilization profile), and a second temperature trend of a second processor "GPU1" running at 70% loading/utilization (e.g., set to run with a 70% loading/utilization profile). Plot (B) in FIG. 5 illustrates a third temperature trend of the first processor "GPU0" running at 60% loading/utilization (e.g., set to run with a 60% loading/utilization profile), and a fourth temperature trend of a second processor "GPU1" running at 60% loading/utilization (e.g., set to run with a 60% loading/utilization profile). A processor set to run at a certain percentage loading/utilization can enforce that the amount of loading/utilization of the processor consumed or taken up by the compute operations that the processor is performing do not exceed the percentage. The first temperature trend exhibits a fast transient thermal failure as illustrated in FIG. 1. The first processor running at 70% loading/utilization experiences a thermal trip event at around 2 minutes. The second temperature trend exhibits a slow creeping thermal failure as illustrated in FIG. 2. The second processor having the second temperature trend may experience a thermal trip event at a later time. The shapes of the trends are different for different processors running at different percentages of loading/utilization. When a processor runs at a higher percentage loading/utilization, more compute operations are allowed to be performed on the processor, than a processor running at a lower percentage loading/utilization. Temperature of processors running at 70% loading/utilization tend to rise more quickly than the temperature of processors running at 60% loading/utilization.

Figure 6:
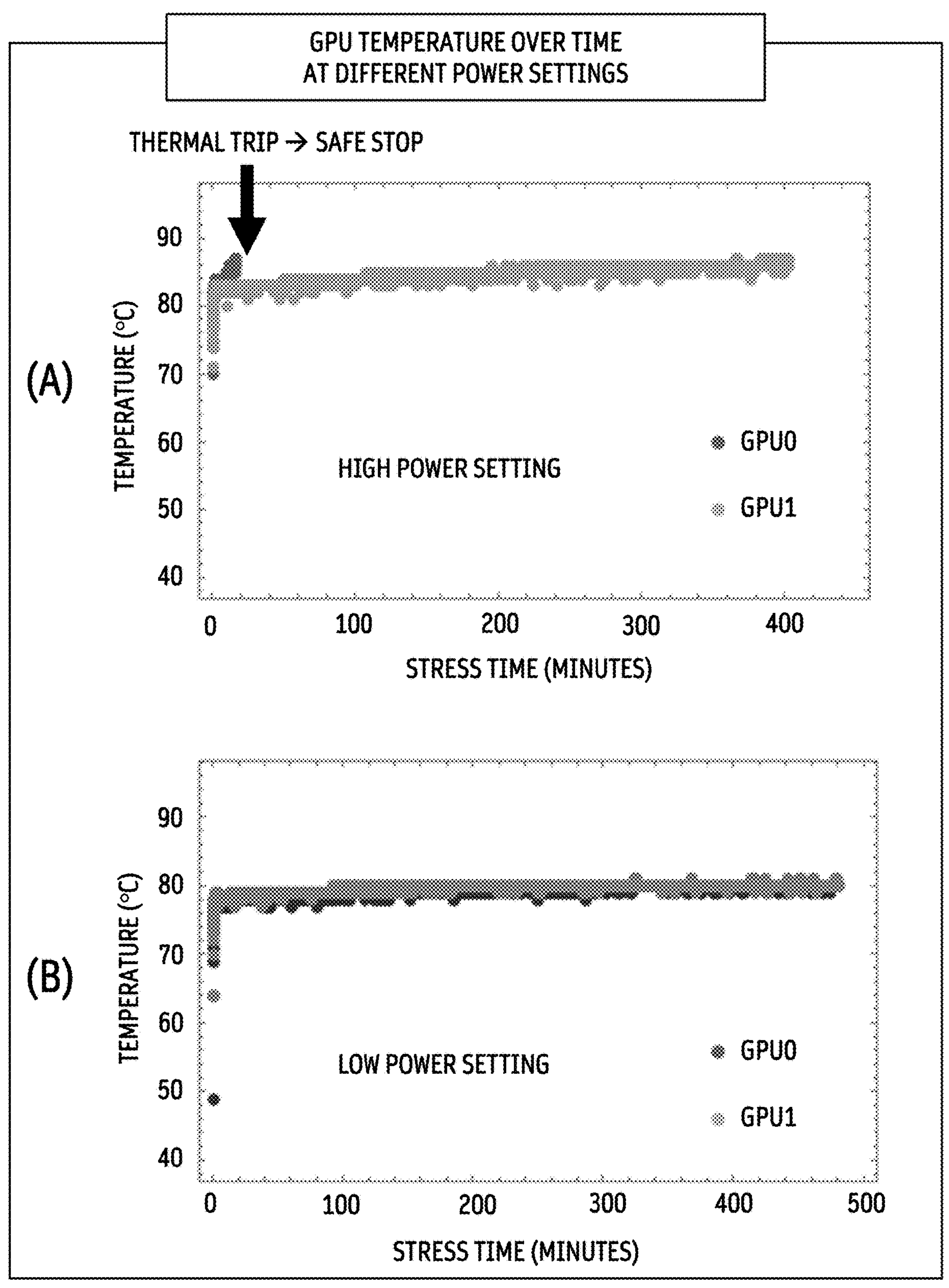
FIG. 6 illustrates different temperature trends of processors running at different power or voltage levels, according to some aspects of the disclosed technology.

FIG. 6 illustrates different temperature trends of processors running at different power or voltage levels (or power modes), according to some aspects of the disclosed technology. Plot (A) in FIG. 6 illustrates a first temperature trend of a first processor "GPU0" set to run with a high-power setting (e.g., a higher voltage setting, a higher supply voltage setting, etc.), and a second temperature trend of a second processor "GPU1" set to run at the high-power setting. Plot (B) in FIG. 6 illustrates a third temperature trend of the first processor "GPU0" set to run with a low power setting (e.g., a lower voltage setting, a lower supply voltage setting, etc.), and a fourth temperature trend of a second processor "GPU1" set to run at the low power setting. The first temperature trend exhibits a fast transient thermal failure as illustrated in FIG. 1. The first processor set to run at high-power experiences a thermal trip event at around 9 minutes. The second temperature trend exhibits a slow creeping thermal failure as illustrated in FIG. 2. The second processor having the second temperature trend may experience a thermal trip event at a later time. The shapes of the trends are different for different processors set to run at different power/voltage settings or modes. When a processor is set to run in high-power mode, more compute operations are allowed to be performed on the processor (thus consuming more power), than a processor set to run in a low power mode. Temperature of processors set to run at a high-power setting tends to rise more quickly than the temperature of processors set to run at a low power setting.

Changing clock frequency, adjusting percentage loading/utilization, and changing power/voltage settings are examples of compensation actions that can be taken to address overheating and regulate processor temperature. Additional examples of compensation actions are described in FIG. 9. The effects on the temperature may differ depending on which set of one or more compensation actions are taken.

Modeling or Characterizing Temperature Regression

Figure 7:
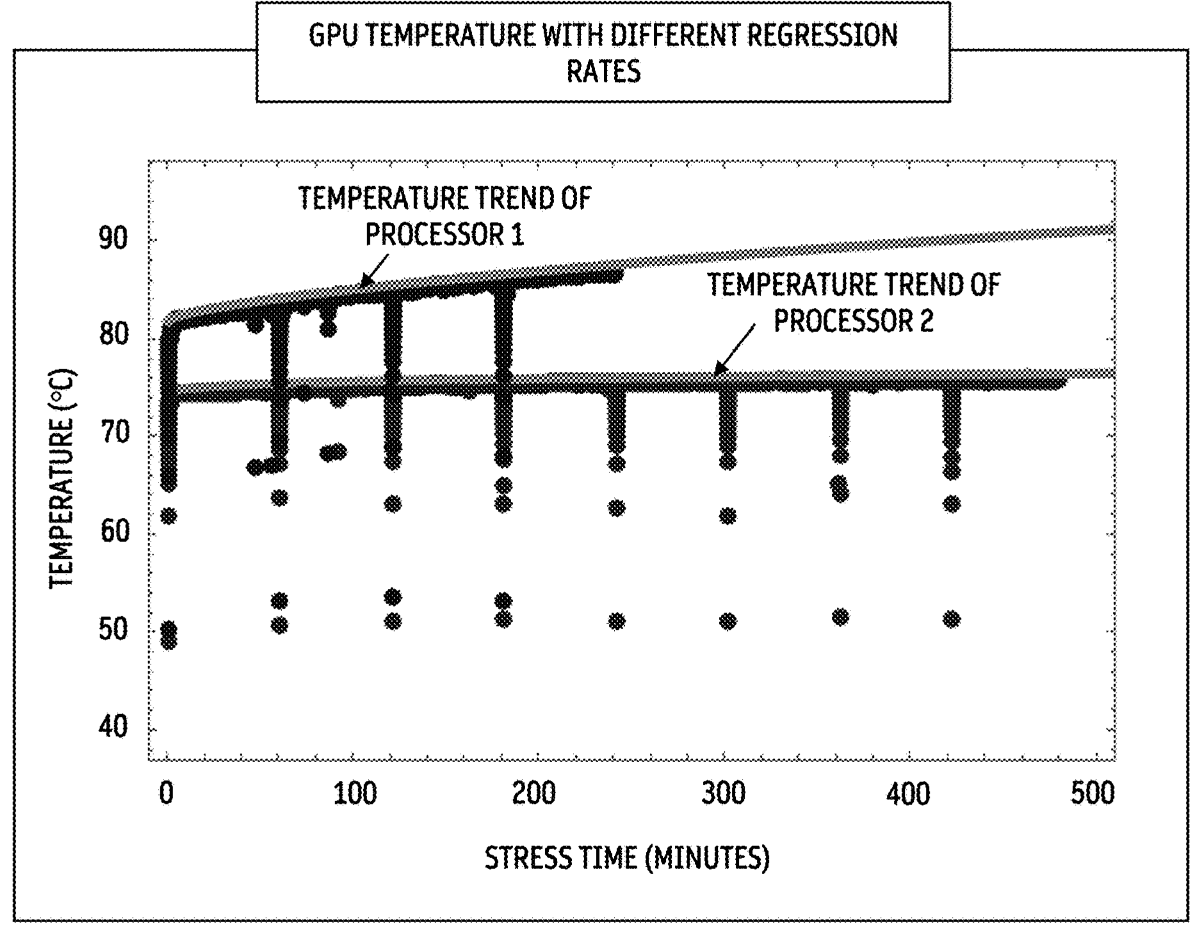
FIG. 7 illustrates processors exhibiting different regression profiles, or regression rates, according to some aspects of the disclosed technology.

FIG. 7 illustrates processors exhibiting different regression profiles, or regression rates, according to some aspects of the disclosed technology. The plot in FIG. 7 illustrates temperature data samples collected for processor 1, and temperature data samples collected for processor 2. Temperature data samples collected for processor 1 have a first temperature trend or profile. Temperature data samples collected for processor 2 have a second temperature trend or profile that is different from the first temperature trend or profile. The temperature of processor 1 is rising (or creeping up) more quickly than the temperature of processor 2 over a same period of time. The first temperature trend and the second temperature trend exhibit different temperature regression rates and/or temperature regression characteristics. The first temperature trend and the second temperature trend exhibit different shapes.

It is possible to fit a line, referred herein as a temperature profile line, to the temperature data samples to mathematically and quantitatively characterize the different temperature trends or profiles exhibited by the temperature data samples collected for the different processors. The temperature profile line can be fitted to (closely) envelop or capture a majority of or all the temperature data samples of a processor.

A temperature profile line may relate time and temperature in a mathematical equation, or a closed form. A temperature profile line may describe the temperature of a processor as a function of time. A temperature profile line may be defined using one or more parameters, which may express how fast the temperature is changing relative to time. One or more parameters that define the temperature profile line can be used to determine a regression profile of the processor. One or more parameters may indicate one or more regression rates, which may indicate how quickly the temperature is rising for the processor. The temperature profile line may also be used to predict the temperature of the processor at a future time.

A temperature profile line may relate time and temperature according to a fractional power law. An exemplary equation for the temperature profile line is as follows:

$$\text{temperature} = a + b * \text{time}^c \qquad \text{(eq. 1)}$$

In the equation 1 above, the parameters of the equation are: a, b, and c. The variables of the equation are temperature and time. It is possible to determine temperature from time, and to determine time from temperature. A first parameter defining the temperature profile line, a, may represent a (fixed) temperature offset (e.g., a starting temperature of the processor, when time=0). a may be a positive number representing a starting temperature of a processor in degrees, e.g., Celsius. A second parameter defining the temperature profile line, b, may represent a linear parameter, e.g., a coefficient or multiplier of $\text{time}^c$. b may be a positive number. A third parameter defining the temperature profile line, c, may represent a fractional power parameter, e.g., an exponent of time. c may be a positive number that is less than 1, or a positive fractional number that is less than 1.

In some embodiments, a temperature profile line may relate time and temperature according to a stretched exponential model. An exemplary equation for the temperature profile line is as follows:

$$\text{temperature} = a + c * e^{-(time/\tau)^{b}} \quad \text{(eq. 2)}$$

In the equation 2 above, the parameters of the equation are a, b, c, and τ. The variables of the equation are temperature and time. It is possible to determine temperature from time, and to determine time from temperature. A first parameter defining the temperature profile line, a, may represent a (fixed) temperature offset (e.g., based on a starting temperature of the processor, when time=0). a may be a positive number accounting for a starting temperature of a processor in degrees, e.g., Celsius. A second parameter defining the temperature profile line, b, may represent a stretching exponent parameter. b may be a number between 0 and 1 to yield a stretched exponential function. A third parameter defining the temperature profile line, c, may represent a linear parameter, e.g., a coefficient or multiplier of $e^{-time^{b}}$. c may be a negative number. A fourth parameter defining the temperature profile line, τ, may represent a timing parameter or constant, e.g., τ may be a positive number.

Figure 8:
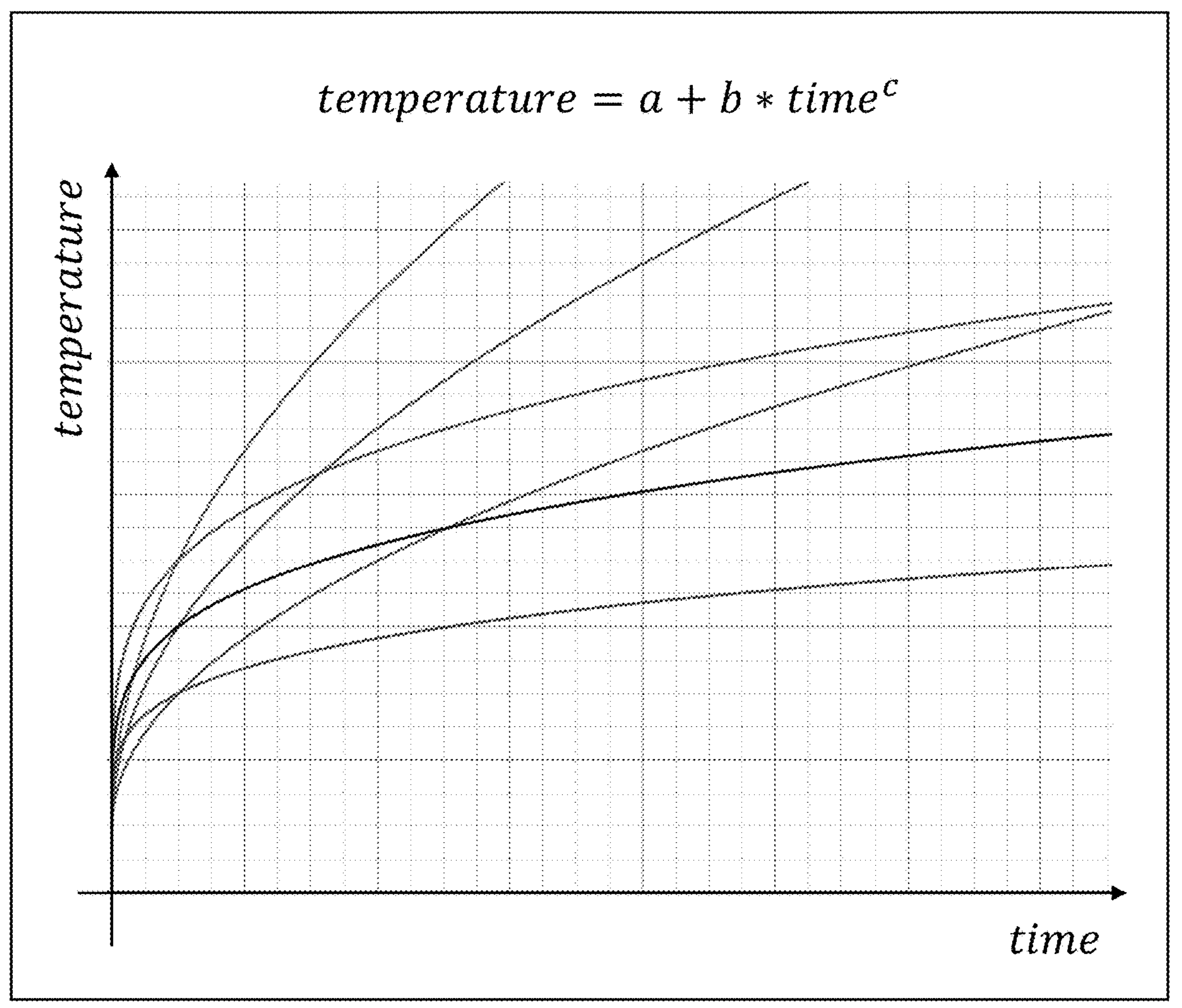
FIG. 8 depicts an exemplary plot of temperature profile lines having different parameters, according to some aspects of the disclosed technology.

FIG. 8 depicts an exemplary plot of temperature profile lines having different parameters, according to some aspects of the disclosed technology. The different temperature profile lines are lines defined using equation 1, where the parameters a, b, and c have varied values. Different values for parameters a, b, and c yield different shapes or temperature trends. If equation 2 is used, different values for parameters a, b, c, and r can yield different shapes or temperature trends.

The parameters, a, b, and c, of a temperature profile line fitted to temperature data samples can be indicative of how temperature regresses for a processor. The parameters can be used as one or more indicators of temperature regression. The parameters can be used to determine a temperature regression profile of a processor. The parameters can be used to classify the temperature regression profile of a processor.

Having a temperature profile line (and its parameters) enables prediction or forecasting of processor temperature at a future time. Using the one or more parameters that define the temperature profile line and the equation for the temperature profile line, it is possible to predict a temperature of the processor for a given time. Using the one or more parameters that define the temperature profile line and the equation for the temperature profile line, it is possible to predict when (e.g., an expected or estimated time) the processor may reach a particular temperature, such as a critical temperature.

As illustrated in FIGS. 4-7, temperature trends of processors can differ. Temperature trends may exhibit different temperature regression rates (e.g., indicating how quickly temperature is rising for a processor over time). Temperature trends may exhibit different regression profiles. Temperature trends may indicate different states or stages of regression of the processor's ability to cool itself and not overheat. Regression profiles may include classes of processors with different temperature trends or states/stages of temperature regression. Examples of classes or regression profiles of processors may include: good, bad, okay, critical, strong, weak, no-concerns, replacement-required, urgent-servicing-required, servicing-required-when-convenient, fast-transient-thermal-failure-likely, slow-creeping-thermal-failure, creeping-thermal-failure-speed-1, creeping-thermal-failure-speed-2, creeping-thermal-failure-speed-3, creeping-thermal-failure-speed-4. Regression profiles may include a timing indicator that indicates urgency/criticality or how much time remains until the processor is predicted to reach a critical temperature.

Different regression profiles may have corresponding characteristics that are characteristic, representative, or distinctive of a given regression profile. The characteristics may include a parameter value of a temperature profile line, a range of a parameter values of a temperature profile line, a threshold of a parameter value of a temperature profile line, timing indicator, and/or suitable combination or sets thereof. A table or data structure, such as a lookup table, may be used to associate characteristics of different regression profiles with different regression profiles.

A model may be used to receive parameters of the temperature profile line and generate a classification, e.g., a temperature regression profile. A decision tree or logic tree model may be used to receive parameters of the temperature profile line and map the parameters to a classification, e.g., a temperature regression profile.

Figure 9:
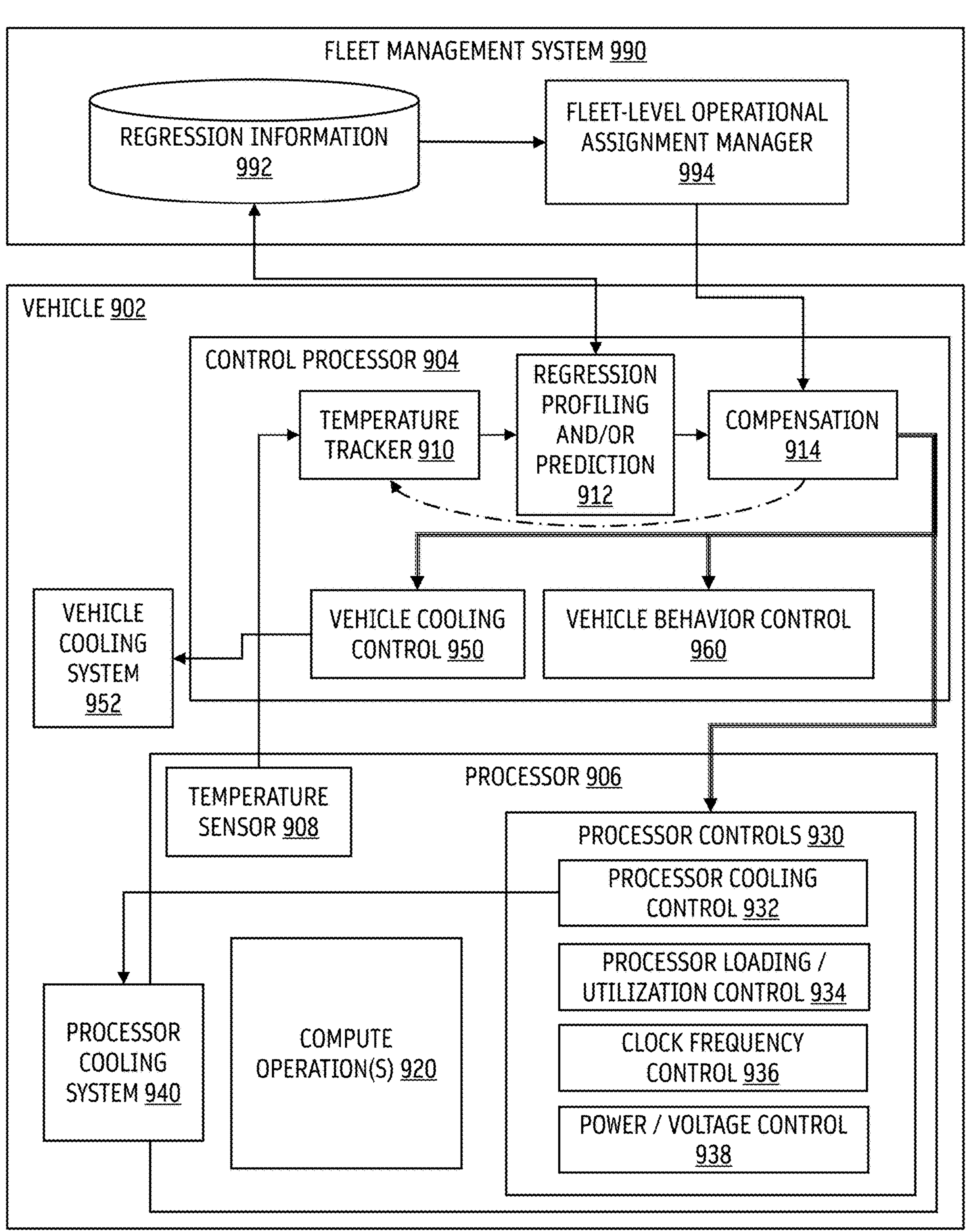
FIG. 9 depicts a vehicle having an adaptive self-heating management of processors implemented on a control processor, and an optional fleet management system to manage one or more vehicles, according to some aspects of the disclosed technology.

A Vehicle Implementing Adaptive Self-Heating Management and a Fleet Management System Managing the Vehicle FIG. 9 depicts a vehicle 902 having an adaptive self-heating management of processor 906 implemented on a control processor 904, and an optional fleet management system 990 to manage one or more vehicles such as vehicle 902, according to some aspects of the disclosed technology.

Vehicle 902 may include processor 906, which may be susceptible to overheating. Vehicle 902 may be an AV. Processor 906 may be instructed to perform or execute one or more compute operations 920, which may cause processor 906 to heat up. Vehicle 902 may include temperature sensor 908, which can sense the temperature of processor 906. Temperature sensor 908 may be collocated with processor 906. Temperature sensor 908 may be embedded in processor 906. Temperature sensor 908 can generate and output temperature data samples over time (e.g., at a certain cadence or frequency). Temperature sensor 908 may generate and output multiple temperature data samples a second.

Vehicle 902 may include control processor 904. Control processor 904 may execute instructions that cause the control processor 904 to implement temperature tracker 910, regression profiling and/or prediction 912, and compensation 914.

Temperature tracker 910 may receive the temperature data samples produced by temperature sensor 908.

Regression profile and/or prediction 912 may determine a temperature profile line that fits the temperature data samples. Examples of temperature profile lines are described with FIGS. 7-8. Regression profile and/or prediction 912 may fit a temperature profile line to the temperature data samples. Regression profile and/or prediction 912 may determine a temperature profile line that most closely envelopes or captures the temperature data samples or a majority thereof.

Regression profile and/or prediction 912 may determine estimated time to critical temperature based on a critical temperature point on the temperature profile line. In some cases, the determination of the compensation action may be based on the estimated time to critical temperature. The determination of the one or more compensation actions can be based on the estimated time to critical temperature and the regression profile.

Regression profile and/or prediction 912 may determine a regression profile based on one or more parameters defining the temperature profile line. In some embodiments, regression profile and/or prediction 912 may compare one or more parameters defining the temperature profile line against one or more thresholds. Result of a comparison of a parameter against a threshold can indicate whether temperature regression is good or bad for a processor. Result of a comparison of a parameter against a threshold can determine whether the processor has a particular regression profile. For example, a first parameter a may be compared against a first threshold. A second parameter b may be compared against a second threshold. A third parameter c may be compared against a third threshold. In some embodiments, regression profile and/or prediction 912 may determine whether the one or more parameters defining the temperature profile line fall within a parameter value range of a plurality of parameter value ranges corresponding to different regression profiles. In some embodiments, regression profile and/or prediction 912 may look up the regression profile in a look up table using the one or more parameters defining the temperature profile line. The look up table may associate different characteristic values for the one or more parameters with different regression profiles.

Compensation 914 may, based on the regression profile, determine one or more compensation actions that modify one or more of: the processor and the vehicle. Compensation 914 may trigger the one or more compensation actions to be performed. Compensation 914 may perform the one or more compensation actions. Compensation 914 may cause the one or more compensation actions to be performed.

In some cases, compensation 914 may identify one or more compensation actions that help to lower the temperature of processor 906. In some cases, compensation 914 may identify one or more compensation actions that could increase the temperature of processor 906. Compensation 914 may identify one or more compensation actions that regulate (up or down) the temperature of processor 906. Compensation 914 may identify one or more compensation actions that optimize or maximize the performance or utilization of processor 906. In some cases, one or more compensation actions may be performed to lower the temperature of processor 906 at the cost of reduction in performance of processor 906. When the temperature of processor 906 is lowered sufficiently, the one or more compensation actions may be performed to increase the performance of processor 906 back up to maximize the performance of processor 906 while ensuring processor 906 does not reach a critical temperature.

Temperature tracker 910 may run continuously or repeatedly. Temperature tracker 910 may collect temperature data samples produced by temperature sensor 908 over a period of time, e.g., at AV stack launch and during operation of vehicle 902. Regression profiling and/or prediction 912 may run continuously or repeatedly. Regression profiling and/or prediction 912 may use an up-to-date set of temperature data samples collected by temperature tracker 910 and update determinations of regression profiles and/or predictions about when the processor may reach a critical temperature. In some embodiments, compensation 914 may trigger one or more compensation actions to be performed, which may impact or change the regression profile of processor 906. After the one or more compensation actions are performed, temperature tracker 910 may track further temperature data samples of the processor over a further period of time, the processor being part of a vehicle. Also, regression profiling and/or prediction 912 may determine a further temperature profile line that envelops the temperature data samples and the further temperature data samples. Regression profiling and/or prediction 912 may determine a further regression profile based on one or more further parameters defining the further temperature profile line. Regression profiling and/or prediction 912 may determine a further estimated time to critical temperature based on a critical temperature point on the further temperature profile line. Compensation 914 may determine one or more further compensation actions based on the further regression profile and/or the estimated time to critical temperature and cause the one or more further compensation action(s) to be performed.

Compensation 914 may modify processor 906, through processor controls 930 of processor 906. Processor controls 930 may manage operations of processor 906, and cause processor 906 to operate according to one or more selected settings and/or one or more operating modes.

In some embodiments, the one or more compensation actions determined by compensation 914 may include changing a loading/utilization profile of processor 906. The change may impact the temperature of the processor, in a manner illustrated in FIG. 5. Compensation 914 may transmit, to processor loading/utilization control 934, a command to change a loading/utilization profile (e.g., different profiles may be associated with different amounts of maximum allowed loading/utilization). The command may request processor loading/utilization control 934 to reduce (or increase) utilization of processor 906 by compute operation(s) 920. The command may request processor loading/utilization control 934 to reduce (or increase) percentage utilization of processor 906 by a certain amount.

In some embodiments, the one or more compensation actions determined by compensation 914 may include changing a clock frequency of processor 906. The change may impact the temperature of the processor, in a manner illustrated in FIG. 4. Compensation 914 may transmit, to clock frequency control 936, a command to change a clock frequency of the processor. The command may request clock frequency control 936 to reduce (or increase) a clock frequency of processor 906 or change a clock frequency setting (e.g., to a lower or higher clock frequency setting). The command may request clock frequency control 936 to lower (or raise) a clock frequency of processor 906, e.g., by a certain amount. The command may request clock frequency control 936 to change a clock frequency setting of processor 906 to a lower (or higher) clock frequency setting.

In some embodiments, the one or more compensation actions determined by compensation 914 may include changing a power/voltage level of processor 906. The change may impact the temperature of the processor, in a manner illustrated in FIG. 6. Compensation 914 may transmit, to power/voltage control 938, a command to change a power level or voltage level of the processor. The command may request power/voltage control 938 to reduce (or increase) a power level or voltage level of processor 906 or change a power setting (e.g., to a lower or higher power mode). The command may request power/voltage control 938 to lower (or raise) a power/voltage level of processor 906, e.g., by a certain amount. The command may request power/voltage control 938 to change a power/voltage setting of processor 906 to a lower (or higher) power/voltage setting.

In some embodiments, the one or more compensation actions determined by compensation 914 may include commanding processor cooling control 932 of processor 906 to increase cooling to processor 906. Processor cooling control 932 may control processor cooling system 940 to regulate a temperature of processor 906. Processor cooling system 940 may include a mechanical thermal cooling system to regulate a temperature of processor 906.

In some embodiments, the one or more compensation actions determined by compensation 914 may include commanding vehicle cooling control 950 of processor 906 to increase cooling to processor 906 or an assembly enclosing processor 906. Vehicle cooling control 950 may control vehicle cooling system 952 to regulate a temperature of processor 906 or an assembly enclosing processor 906. Vehicle cooling system 952 may include a HVAC system of vehicle 902. Vehicle cooling system 952 may include an active heating and cooling system. Vehicle cooling system 952 may include a passive heating and cooling system (e.g., leveraging temperature and airflow surrounding vehicle 902 when the air surrounding vehicle 902 is cooler than processor 906). Vehicle cooling control 950 may command vehicle cooling system 952 to increase cooling (or decrease cooling) directed to processor 906. Compensation 914 may transmit a command to vehicle cooling system 952 of the vehicle 902 to decrease cooling to a cabin of the vehicle (e.g., shut off or turn down cooling to the cabin) and increase cooling to processor 906. Compensation 914 may transmit a command to vehicle cooling system 952 of the vehicle 902 to decrease cooling to a cabin of the vehicle (e.g., shut off or turn down cooling to the cabin) and increase cooling to processor 906 for a limited period of time if a passenger is in vehicle 902. Compensation 914 may transmit a command to vehicle cooling system 952 of the vehicle 902 to decrease cooling to a cabin of the vehicle (e.g., shut off or turn down cooling to the cabin) and increase cooling to processor 906 for a longer period of time if a passenger is not in vehicle 902, or until temperature of processor 906 reaches a lower temperature. Compensation 914 may transmit a command to vehicle cooling system 952 of the vehicle 902 to decrease cooling to a cabin of the vehicle (e.g., shut off or turn down cooling to the cabin) and increase cooling to processor 906 for a longer period of time if a passenger is not in vehicle 902 and the next operational assignment (e.g., to pick-up a passenger) is a certain time away, or until temperature of processor 906 reaches a lower temperature.

In some situations, it may not be desirable to modify settings or modes of processor 906. It may not be desirable to modify settings or modes of processor 906 on the fly or during operation of the AV. In some situations, the modifications may be insufficient for reducing the temperature of processor 906. In addition to or in place of modifying processor 906, compensation 914 may regulate the temperature of processor 906 through other mechanisms, such as modifying vehicle 902, or behavior of vehicle 902, through vehicle behavior control 960.

Vehicle behavior control 960 may manage behavior of vehicle 902. The loading/utilization of processor 906 by compute operation(s) 920 can depend on one or more factors, such as operations in the AV stack and driving conditions of vehicle 902. By changing operations in the AV stack (e.g., de-optimizing operations in the AV stack to use less resources on processor 906, add artificial delays or wait states, reduce average compute operations per second), the loading/utilization of processor 906 may change. As a result, changing operations in the AV stack of vehicle 902 may cause the temperature of processor 906 to change as well. By changing the behavior of vehicle 902 and driving conditions of vehicle 902 through vehicle behavior controls 960, the loading/utilization of processor 906 may change. As a result, changing behavior of vehicle 902 may cause the temperature of processor 906 to change as well.

The loading/utilization of processor 906 by compute operation(s) 920 can depend on complexity of scene, e.g., number of surrounding pedestrians, number of tracked objects, etc. To reduce loading/utilization of processor 906, vehicle behavior controls 960 can route the AV to places or roads expected to have less complex scenes. The loading/utilization of processor 906 by compute operation(s) 920 can depend on the size or range of the spatial region the AV is expected to be able to keep track of or perceive, which can depend on the speed limit or how fast the AV is driving. For example, an AV may be expected to track all objects within 30 m when driving on 25 mph roads. An AV may be expected to track all objects within 50 m when driving on 45 mph roads. To reduce loading/utilization of processor 906, vehicle behavior controls 960 can route the AV to places with lower speed limits and stop tracking objects which are farther away. To reduce loading/utilization of processor 906, vehicle behavior controls 960 can implement or enter a degraded state where the AV's speed and level of perception processing may be limited even further. To reduce loading/utilization of processor 906, vehicle behavior controls 960 can reduce range of tracked objects by reducing the maximum speed of the AV (e.g., the AV may be limited to 15 mph in 25 mph zone, and be able to drop tracking range to 20 m). If thermal regression is slow, loading/utilization of processor 906 may not need to be reduced immediately or urgently. If the remaining portion of the current operational assignment (e.g., a trip to drop-off a passenger) is relatively short, vehicle behavior controls 960 can allow the AV to finish the current operational assignment with no changes, then change behavior when the AV has completed the current operational assignment (e.g., dropped off the passenger). Vehicle behavior controls 960 can cause the AV to change route or follow a revised route after completion of the current operational assignment, e.g., park somewhere to cool down, direct HVAC to cool processor 906 when there is no passenger in the AV, or return to the garage.

At least a part of vehicle behavior controls 960 may be implemented by control processor 904. At least a part of vehicle behavior controls 960 may be implemented by processor 906. At least a part of vehicle behavior controls 960 may be implemented by a different processor provided on vehicle 902 (not shown). Vehicle behavior control 960 may include at least a part of an AV stack implemented on vehicle 902. Vehicle behavior control 960 may determine routing or a route of vehicle 902. Vehicle behavior control 960 may cause vehicle 902 to follow or complete a route. Vehicle behavior control 960 may execute or complete operational assignment(s) assigned to vehicle 902. Vehicle behavior control 960 may cause vehicle 902 to drive under certain driving constraints of vehicle 902. Vehicle behavior control 960 may cause vehicle 902 to enter a degraded state of operation. Vehicle behavior control 960 may cause vehicle 902 to enter a different mode of operation.

In some embodiments, the one or more compensation actions determined by compensation 914 may change vehicle 902 in a way to help regulate temperature of processor 906. the one or more compensation actions determined by compensation 914 may change vehicle 902 in a way to reduce compute operations(s) 920, so that processor 906 would have less self-heating. The one or more compensation actions determined by compensation 914 may include commanding vehicle behavior control 960 to change or modify the behavior of vehicle 902.

In some embodiments, the one or more compensation actions determined by compensation 914 may include changing a route of the vehicle, through vehicle behavior control 960. The one or more compensation actions may include determining a revised route for the vehicle, and transmitting, to a vehicle behavior control part, a command to cause the vehicle to follow the revised route.

In some embodiments, the one or more compensation actions determined by compensation 914 may include changing a maximum speed of vehicle 902, through vehicle behavior control 960.

In some embodiments, the one or more compensation actions determined by compensation 914 may include causing vehicle 902 to enter a degraded state of operation.

In some embodiments, the one or more compensation actions determined by compensation 914 may include allowing vehicle 902 to complete a current operational assignment (e.g., dropping off a passenger and letting the AV be empty), and after vehicle 902 completes the current operational assignment, changing a route of the vehicle (e.g., look for and park in a parking spot in the shade).

In some embodiments, the one or more compensation actions determined by compensation 914 may include allowing vehicle 902 to complete a current operational assignment (e.g., dropping off a passenger and letting the AV be empty), and after vehicle 902 completes the current operational assignment, transmitting a command to vehicle cooling control 950 to cause vehicle cooling system 952 to direct cooling to processor 906, potentially allowing a cabin of vehicle 902 to heat up. Compensation 914 may, after vehicle 902 completes a current operational assignment (e.g., dropping off a passenger and letting the AV be empty), transmit a command to vehicle cooling system 952 of the vehicle 902 to decrease cooling to a cabin of the vehicle (e.g., shut off or turn down cooling to the cabin) and increase cooling to processor 906.

In some embodiments, a suitable combination of compensation actions may be determined and triggered to be performed by compensation 914 to address temperature regression of processor 906. Compensation action(s) may be performed by compensation 914, and compensation 914 may wait for a period of time before determining further compensation action(s), to avoid overcompensation or over correction of the temperature of the processor 906.

In some embodiments, compensation 914 may determine compensation action(s) using an escalation ladder that sorts possible compensation actions in a sequence of escalating steps, where the sequence of steps may be performed if no or little improvement in temperature regression is observed after performing a previously performed compensation action or step.

The following shows exemplary pseudocode illustrating using different compensation actions depending on the regression profile or regression rates (e.g., whether a parameter of the temperature profile line crosses a threshold).

```
if parameter_temperature_profile_line >= higher threshold:
  pull_over( )
elif parameter_temperature_profile_line >= lower_threshold:
  if vehicle_has_rider and
      (not air_conditioning.enabled or
    max_cooling.running_time < 2 minutes)
  or not has_rider and
      (time_until_next_pickup > 5 minutes):
    # Redirect cooling from air conditioning to compute
    max_cooling.enable ( )
  else:
    new_route = generate_route_in_less_populated_area( )
    if new_route.time - cur_route.time < 20% *
cur_route.time:
        set_route(new_route)
```

-continued

```
  else:
    set_maximum_speed (80% * speed_limit)
    reduce_detection_region_by (80%)
    processor.clocks = 90% * processor.max_clocks
```

In some embodiments, vehicle 902 may transmit, to fleet management system 990, information about temperature regression occurring on vehicle 902. Vehicle 902 may be part of a fleet of vehicles managed by fleet management system 990. The information may include one or more of: the regression profile, one or more parameters defining the temperature profile line, estimated time to critical temperature, and the one or more compensation actions that may have been performed on vehicle 902 to regulate temperature of processor 906. The information from vehicle 902 and other vehicles in the fleet may be collected in regression information 992.

In some cases, the information transmitted from vehicle 902 and other vehicles in the fleet to fleet management system 990 may include the temperature data samples produced by temperature sensor 908 and other temperature sensors on other vehicles. The temperature data samples may be collected in regression information 992. Fleet management system 990 may implement processing, such as temperature tracker 910, regression profiling and/or prediction 912, and/or compensation 914, to process the temperature data samples (remotely). Regression profiling and/or prediction 912 may compute or derive information about temperature regression of vehicle 902 and store the information in regression information 992.

Fleet management system 990 may determine one or more compensation actions to be performed by vehicle 902 based on an estimated time to critical temperature, and an estimated time for vehicle 902 to complete a current operational assignment. If the estimated time to critical temperature is significantly greater than the estimated time for vehicle 902 to complete the current operational assignment, fleet management system 990 may allow vehicle 902 to complete the current operational assignment and trigger a compensation action to be performed only after vehicle 902 completes the current operational assignment. If the estimated time to critical temperature is less than the estimated time for vehicle 902 to complete the current operational assignment, fleet management system 990 may trigger vehicle 902 to gracefully come to a stop (abort the current operational assignment early) and coordinate a nearby vehicle in the fleet to allow vehicle 902 to hand off the current operational assignment to be completed by the new vehicle. If the estimated time to critical temperature is less than the estimated time for vehicle 902 to complete the current operational assignment and a nearby vehicle is unavailable, fleet management system 990 may trigger vehicle 902 to gracefully come to a stop (pause the current operational assignment early) and trigger a compensation action to be performed. Fleet management system 990 may allow vehicle 902 to resume completing the current operational assignment when the temperature of processor 906 is back to acceptable levels.

Fleet management system 990 may use information in regression information 992 to make operational decisions about vehicle 902 at a fleet-level. Fleet management system 990 may include fleet-level operational assignment manager 994 to make such operational decisions about vehicle 902 at a fleet-level. Fleet management system 990 may determine one or more compensation actions and trigger vehicle 902 to perform the one or more compensation actions. Fleet management system 990 may arrange or sort vehicles in the fleet based on regression profiles, or estimated times to critical temperature, and determine one or more compensation actions for a subset of vehicles having a particular selected regression profile or similar estimated times to critical temperature. Fleet management system 990 can trigger the subset of vehicles (together) to perform the one or more compensation actions. Fleet management system 990 may determine one or more compensation actions for a different subset of vehicles having a different selected regression profile or similar estimated times to critical temperature. Fleet management system 990 can trigger the different subset of vehicles (together) to perform the one or more compensation actions. For example, fleet management system 990 may route (e.g., send routing or assign operational assignments to) a first subset of vehicles having good temperature regression profiles to busier areas, and route (e.g., send routing or assign operational assignments to) a second subset of vehicles having mild temperature regression profiles to less busy areas. In another example, fleet management system 990 may assign shorter duration operational assignments to a first subset of vehicles having shorter estimated times to critical temperature, and assign longer duration operational assignments to a second subset of vehicles having longer estimated times to critical temperature.

Exemplary Temperature Regulation Methods

Figure 10:
FIG. 10 is a flow diagram illustrating a computer-implemented method that can be performed in a vehicle, according to some aspects of the disclosed technology.
Figure 10:
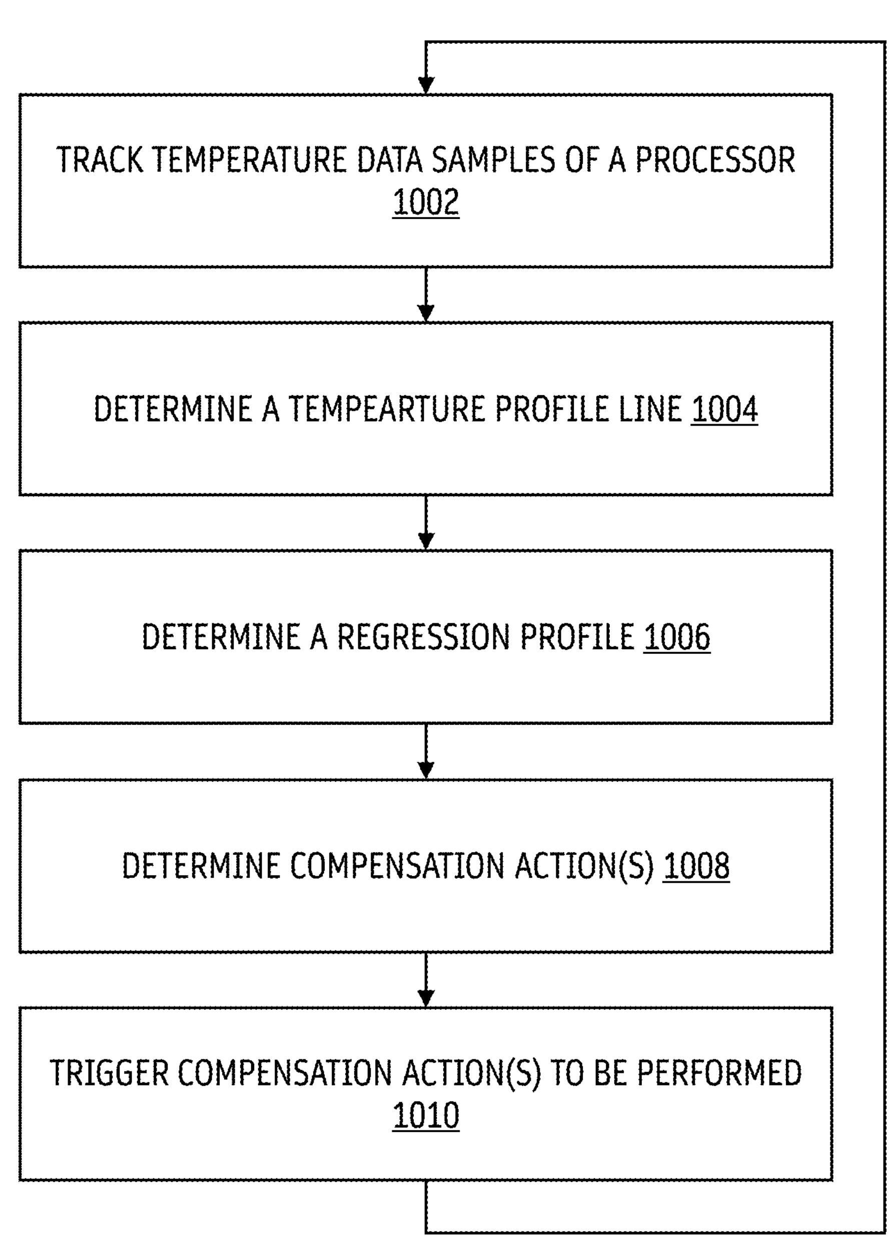

FIG. 10 is a flow diagram illustrating a computer-implemented method 1000 that can be performed in a vehicle, according to some aspects of the disclosed technology. The method 1000 may be carried out by and/or implemented in vehicle 902 depicted in the FIGS. 9 and 12. The method 1000 may be carried out by and/or implemented in fleet management system 990 depicted in the FIGS. 9 and 12. The method 1000 may be carried out by and/or implemented in processor-based system 1300 of FIG. 13.

In 1002, temperature data samples of a processor may be tracked over a period of time. The processor may be a part of a vehicle, such as an AV. A period of time may include at start or turning on of a vehicle (e.g., AV stack launch) and during operation of the vehicle.

In 1004, a temperature profile line that envelops the temperature data samples may be determined.

In 1006, a regression profile may be determined based on one or more parameters defining the temperature profile line. A regression profile may include a class of temperature regression, or a selection of a regression profile that matches the parameters of the temperature profile line. A regression profile may include an estimated time to critical temperature. A regression profile may include whether one or more parameters meets a criterion (e.g., crosses a threshold).

In 1008, based on the regression profile, one or more compensation actions may be determined. The one or more compensation actions may modify one or more of: the processor and the vehicle.

In 1010, the one or more compensation actions may be triggered to be performed.

Method may return to 1002 and continue to track temperature data and update the temperature profile line and the regression profile.

Figure 11:
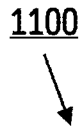
FIG. 11 is a flow diagram illustrating a computer-implemented method that can be performed in a fleet management system, according to some aspects of the disclosed technology.
Figure 11:
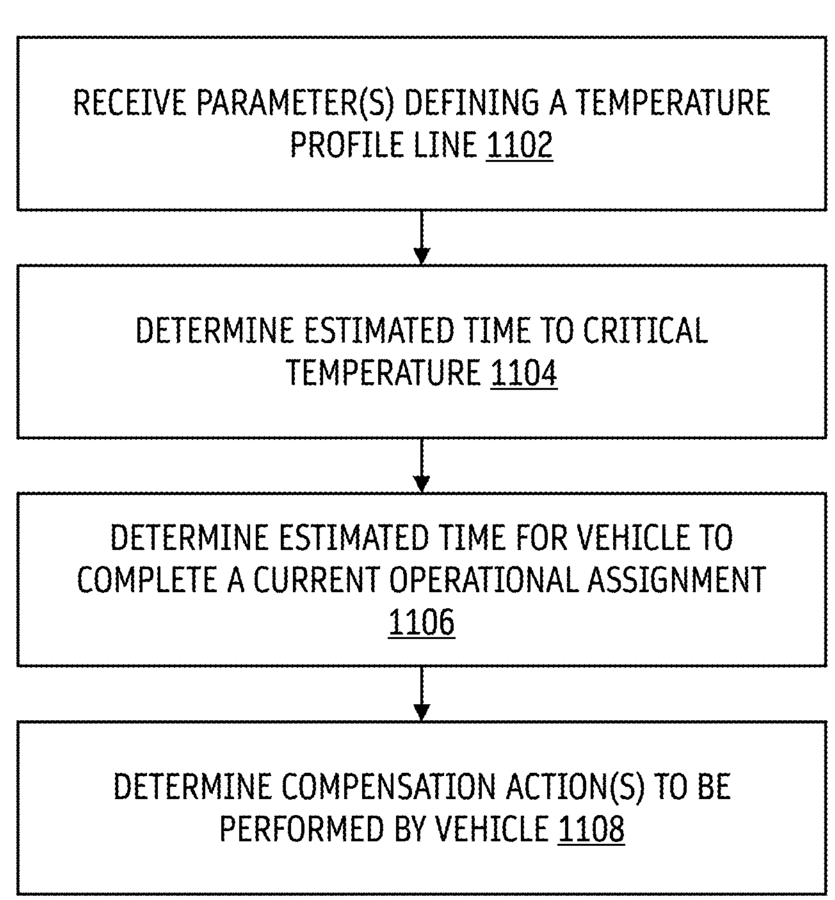

FIG. 11 is a flow diagram illustrating a computer-implemented method 1100 that can be performed in a fleet management system, according to some aspects of the disclosed technology. The method 1100 may be carried out by and/or implemented in fleet management system 990 depicted in the FIGS. 9 and 12. The method may be carried out by and/or implemented in processor-based system 1300 of FIG. 13.

In 1102, one or more parameters defining a temperature profile line may be received. The temperature profile line may be representative of a relationship between a temperature of a processor of a vehicle and time.

In 1104, an estimated time to critical temperature may be determined based on a critical temperature point on the temperature profile line.

In 1106, an estimated time for the vehicle to complete a current operational assignment may be determined.

In 1108, based on the estimated time to critical temperature and the estimated time for the vehicle to complete the current operational assignment, one or more compensation actions to be performed by the vehicle may be determined.

Exemplary AV Management System

Figure 12:
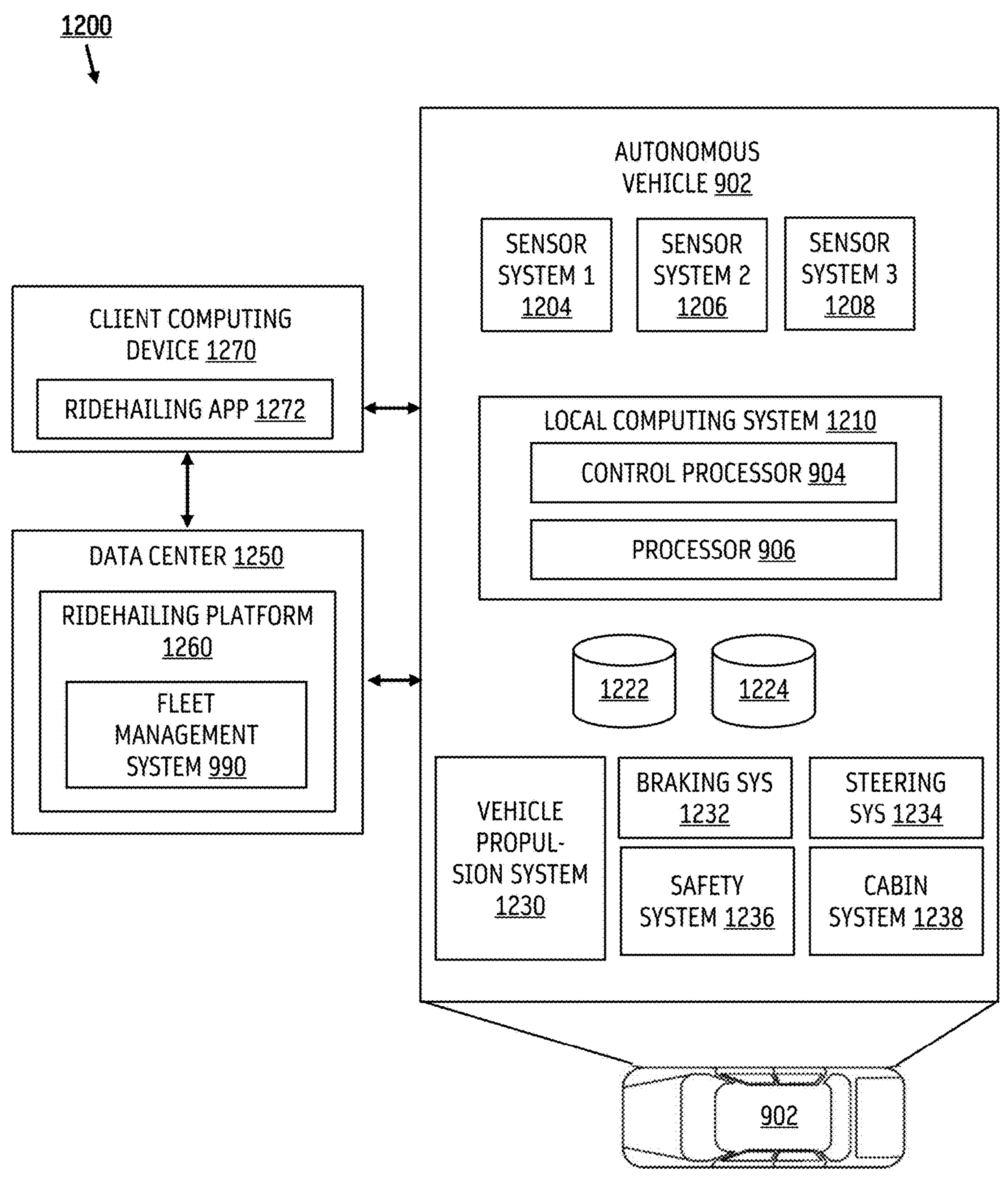
FIG. 12 illustrates an exemplary system environment that may be used to facilitate AV operations, according to some aspects of the disclosed technology.

Turning now to FIG. 12, this figure illustrates an example of an AV management system 1200, in which some of the aspects of the present disclosure can be implemented. One of ordinary skill in the art will understand that, for the AV management system 1200 and any system discussed in the present disclosure, there may be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 1200 includes a vehicle 902, a data center 1250, and a client computing device 1270. The vehicle 902, the data center 1250, and the client computing device 1270 may communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

Vehicle 902 may navigate about roadways without a human driver based on sensor signals (e.g., referred herein as sensor data source(s)) generated by multiple sensor systems 1204, 1206, and 1208. The sensor systems 1204-1208 may include different types of sensors and may be arranged about vehicle 902. For instance, the sensor systems 1204-1208 may comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, ultrasonic sensors, capacitive sensors, time-of-flight sensors, pressure sensors, temperature sensors, and so forth. For example, the sensor system 1204 may be a camera system, the sensor system 1206 may be a LIDAR system, and the sensor system 1208 may be a RADAR system. Other embodiments may include any other number and type of sensors.

Vehicle 902 may also include vehicle actuators, including several mechanical systems 1230-1238 that may be used to maneuver or operate vehicle 902. For instance, the vehicle actuators may include vehicle propulsion system 1230, braking system 1232, steering system 1234, safety system 1236, and cabin system 1238, among other systems. Vehicle actuators may include vehicle signal lights, vehicle honk, vehicle gear, vehicle doors, etc. Vehicle propulsion system 1230 may include an electric motor, an internal combustion engine, or both. The braking system 1232 may include an engine brake, a wheel braking system (e.g., a disc braking system that utilizes brake pads), hydraulics, actuators, and/or any other suitable componentry configured to assist in decelerating vehicle 902. The steering system 1234 may include suitable componentry configured to control the direction of movement of the vehicle 902 during navigation. Safety system 1236 may include lights and signal indicators, a parking brake, airbags, and so forth. The cabin system 1238 may include cabin temperature control systems (e.g., vehicle cooling system 952 of FIG. 9), in-cabin entertainment systems, and so forth. In some embodiments, the vehicle 902 may not include human driver actuators (e.g., steering wheel, handbrake, foot brake pedal, foot accelerator pedal, turn signal lever, window wipers, etc.) for controlling the vehicle 902. Instead, the cabin system 1238 may include one or more client interfaces (e.g., GUIs, Voice User Interfaces (VUIs), etc.) for controlling certain aspects of the mechanical systems 1230-1238.

Vehicle 902 may additionally include a local computing system 1210 that is in communication with the sensor systems 1204-1208, the mechanical systems 1230-1238, the data center 1250, and the client computing device 1270, among other systems. Local computing system 1210 may include control processor 904 and processor 906. Local computing system 1210 may have a physical structure as illustrated in FIG. 3. The local computing system 1210 may include one or more processors and memory, including instructions that may be executed by the one or more processors. Examples of one or more processors may include a CPU, a GPU, a quantum processor, a machine learning processor, an artificial intelligence processor, a neural network processor, an artificial intelligence accelerator, an ASIC, an analog signal processor, an analog computer, a microprocessor, a digital signal processor, a FPGA, a TPU, a DPU, etc. The instructions may make up one or more software stacks or components responsible for controlling the vehicle 902; communicating with the data center 1250, the client computing device 1270, and other systems; receiving inputs from riders, passengers, and other entities within the AV's environment; logging metrics collected by the sensor systems 1204-1208; and so forth. Local computing system 1210 may implement an AV stack. Local computing system 1210 may include HD geospatial database 1222 and AV operational database 1224.

The HD geospatial database 1222 may store HD maps and related data of the streets upon which vehicle 902 travels. In some embodiments, the HD maps and related data may comprise multiple layers, such as an areas layer, a lanes and boundaries layer, an intersections layer, a traffic controls layer, and so forth. The areas layer may include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer may include geospatial information of road lanes (e.g., lane or road centerline, lane boundaries, type of lane boundaries, etc.) and related attributes (e.g., direction of travel, speed limit, lane type, etc.). The lanes and boundaries layer may also include 3D attributes related to lanes (e.g., slope, elevation, curvature, etc.). The intersections layer may include geospatial information of intersections (e.g., crosswalks, stop lines, turning lane centerlines, and/or boundaries, etc.) and related attributes (e.g., permissive, protected/permissive, or protected only left-turn lanes; permissive, protected/permissive, or protected only U-turn lanes; permissive or protected only right-turn lanes; etc.). The traffic controls layer may include geospatial information of traffic signal lights, traffic signs, and other road objects and related attributes.

The AV operational database 1224 may store raw AV data generated by the sensor systems 1204-1208 and other components of the vehicle 902 and/or data received by the vehicle 902 from remote systems (e.g., the data center 1250, the client computing device 1270, etc.). In some embodiments, the raw AV data may include HD LIDAR point cloud data, image or video data, RADAR data, GPS data, and other sensor data that the data center 1250 may use for creating or updating AV geospatial data.

Data center 1250 may be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 1250 may include one or more computing devices remote to the local computing system 1210 for managing a fleet of AVs and AV-related services. For example, in addition to managing the vehicle 902, the data center 1250 may also support a ridehailing/ridesharing service, a delivery service, a remote/roadside assistance service, street services (e.g., street mapping, street patrol, street cleaning, street metering, parking reservation, etc.), and the like.

The data center 1250 may send and receive various signals to and from the vehicle 902 and the client computing device 1270. These signals may include sensor data captured by the sensor systems 1204-1208, roadside assistance requests, software updates, ridehailing/ridesharing pick-up and drop-off instructions, and so forth. In this example, the data center 1250 includes a ridehailing/ridesharing platform 1260.

The ridehailing/ridesharing platform 1260 may interact with a customer of a ridehailing/ridesharing service via a ridehailing/ridesharing application 1272 executing on the client computing device 1270. The client computing device 1270 may be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general-purpose computing device for accessing the ridehailing/ridesharing application 1272. The client computing device 1270 may be a customer's mobile computing device or a computing device integrated with the vehicle 902 (e.g., the local computing system 1210). The ridehailing/ridesharing platform 1260 may receive requests to be picked up or dropped off from the ridehailing/ridesharing application 1272 and dispatch the vehicle 902 for the trip. The ridehailing/ridesharing platform 1260 may implement functionalities of fleet management system 990 and storage of regression information as illustrated with FIG. 9.

Exemplary Processor-Based System

Figure 13:
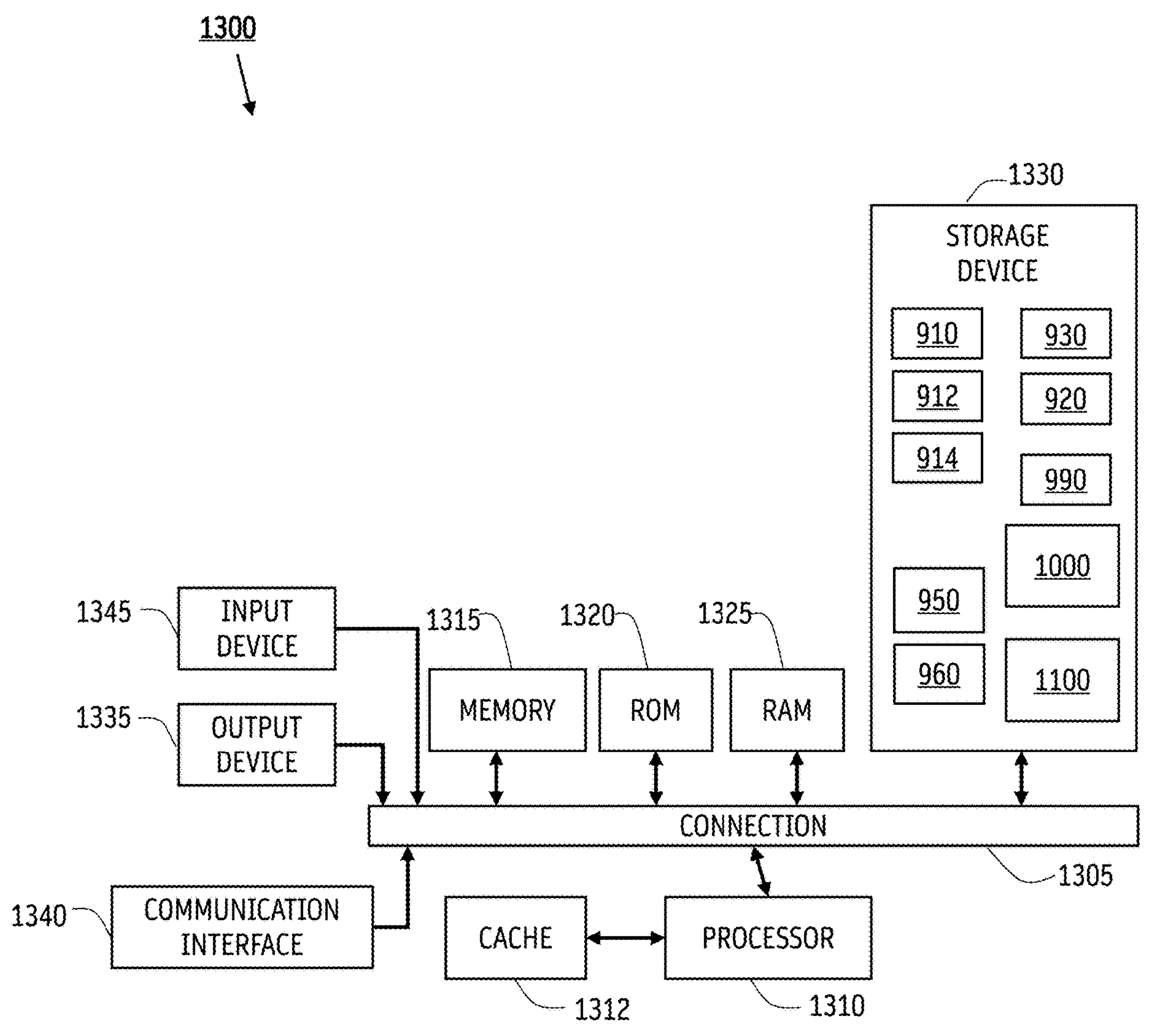
FIG. 13 illustrates an exemplary processor-based system with which some aspects of the subject technology may be implemented.

FIG. 13 illustrates an example processor-based system with which some aspects of the subject technology may be implemented. For example, processor-based system 1300 may be any computing device making up, or any component thereof in which the components of the system are in communication with each other using connection 1305. Connection 1305 may be a physical connection via a bus, or a direct connection into processor 1310, such as in a chipset architecture. Connection 1305 may also be a virtual connection, networked connection, or logical connection.

In some embodiments, computing system 1300 represents the local computing system 1210 of FIG. 12. In some embodiments, one or more of the described system components represents many such components each performing some or all of the function for which the component is described. In some embodiments, the components may be physical or virtual devices.

Exemplary system 1300 includes at least one processor 1310 and connection 1305 that couples various system components including system memory 1315, such as Read-Only Memory (ROM) 1320 and Random-Access Memory (RAM) 1325 to processor 1310. Computing system 1300 may include a cache of high-speed memory 1312 connected directly with, in close proximity to, or integrated as part of processor 1310. Processor 1310 may be a completely self-contained computing system, containing multiple cores or processors, a bus, memory controller, cache, etc. A multi-core processor may be symmetric or asymmetric.

Examples of processor 1310 may include a CPU, a GPU, a quantum processor, a machine learning processor, an artificial intelligence processor, a neural network processor, an artificial intelligence accelerator, an ASIC, an analog signal processor, an analog computer, a microprocessor, a digital signal processor, a FPGA, a TPU, a DPU, etc.

To enable user interaction, computing system 1300 includes an input device 1345, which may represent any number of input mechanisms, such as a microphone for speech, a touch-sensitive screen for gesture or graphical input, keyboard, mouse, motion input, speech, etc. Computing system 1300 may also include output device 1335, which may be one or more of a number of output mechanisms known to those of skill in the art. In some instances, multimodal systems may enable a user to provide multiple types of input/output to communicate with computing system 1300. Computing system 1300 may include communications interface 1340, which may generally govern and manage the user input and system output. The communication interface may perform or facilitate receipt and/or transmission of wired or wireless communications via wired and/or wireless transceivers.

Storage device 1330 may be a non-volatile and/or non-transitory and/or computer-readable memory device and may be a hard disk or other types of computer-readable media which may store data that is accessible by a computer. Storage device 1330 may include software services, servers, services, etc., that when the code that defines such software is executed by the processor 1310, it causes the system 1300 to perform a function. Storage device 1330 may store executable instructions that implement one or more of: functionalities carried out by components illustrated in FIG. 9, method 1000, and method 1100. In some embodiments, the instructions that encode a particular function may use the necessary hardware components, such as processor 1310, connection 1305, output device 1335, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices may be any available device that may be accessed by a general-purpose or special-purpose computer, including the functional design of any special-purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The various embodiments described are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

SELECT EXAMPLES

Example 1 provides a computer-implemented method, including tracking temperature data samples of a processor over a period of time, the processor being part of a vehicle; determining a temperature profile line that envelops the temperature data samples; determining a regression profile based on one or more parameters defining the temperature profile line; based on the regression profile, determining one or more compensation actions that modifies one or more of: the processor and the vehicle; and triggering the one or more compensation actions to be performed.

Example 2 provides the computer-implemented method of example 1, where the temperature profile line relates time and temperature according to a fractional power law.

Example 3 provides the computer-implemented method of example 1 or 2, where determining the temperature profile line includes determining a first parameter defining the temperature profile line that represents a temperature offset; determining a second parameter defining the temperature profile line that represents a linear parameter; and determining a third parameter defining the temperature profile line that represents a fractional power parameter.

Example 4 provides the computer-implemented method of any one of examples 1-3, where determining the regression profile includes comparing the one or more parameters defining the temperature profile line against one or more thresholds.

Example 5 provides the computer-implemented method of any one of examples 1-4, where determining the regression profile includes determining whether the one or more parameters defining the temperature profile line fall within a parameter value range of a plurality of parameter value ranges corresponding to different regression profiles.

Example 6 provides the computer-implemented method of any one of examples 1-5, where determining the regression profile includes looking up the regression profile in a look up table using the one or more parameters defining the temperature profile line, where the look up table associates different characteristic values for the one or more parameters with different regression profiles.

Example 7 provides the computer-implemented method of any one of examples 1-6, further including determining an estimated time to a critical temperature based on a critical temperature point on the temperature profile line, where the determining of the one or more compensation actions is further based on the estimated time to the critical temperature.

Example 8 provides the computer-implemented method of any one of examples 1-7, where the one or more compensation actions includes changing a loading profile of the processor.

Example 9 provides the computer-implemented method of any one of examples 1-8, where the one or more compensation actions includes changing a clock frequency of the processor.

Example 10 provides the computer-implemented method of any one of examples 1-9, where the one or more compensation actions includes changing a voltage level of the processor.

Example 11 provides the computer-implemented method of any one of examples 1-10, where the one or more compensation actions includes commanding a processor cooling control of the processor to increase cooling to the processor.

Example 12 provides the computer-implemented method of any one of examples 1-11, where the one or more compensation actions includes commanding a vehicle cooling control of the vehicle to increase cooling directed to the processor.

Example 13 provides the computer-implemented method of any one of examples 1-12, where the one or more compensation actions includes changing a route of the vehicle.

Example 14 provides the computer-implemented method of any one of examples 1-13, where the one or more compensation actions includes changing a maximum speed of the vehicle.

Example 15 provides the computer-implemented method of any one of examples 1-14, where the one or more compensation actions includes causing the vehicle to enter a degraded state of operation.

Example 16 provides the computer-implemented method of any one of examples 1-15, where the one or more compensation actions includes allowing the vehicle to complete a current operational assignment; and after the vehicle completes the current operational assignment, changing a route of the vehicle.

Example 17 provides the computer-implemented method of any one of examples 1-16, further including transmitting, to a fleet management system, one or more of: the regression profile, one or more parameters defining the temperature profile line, and the one or more compensation actions.

Example 18 provides the computer-implemented method of any one of examples 1-16, further including after the one or more compensation actions are performed, tracking further temperature data samples of the processor over a further period of time; determining a further temperature profile line that envelops the further temperature data samples and the further temperature data samples; and determining a further regression profile based on one or more further parameters defining the further temperature profile line.

Example 19 provides the computer-implemented method of any one of examples 1-18, where the temperature profile line relates time and temperature according to a stretched exponential function.

Example 20 provides a vehicle, including a processor to execute one or more compute operations; a temperature sensor to sense a temperature of the processor and output temperature data samples over time; and a control processor to: receive the temperature data samples; determine a temperature profile line that fits the temperature data samples; determine a regression profile based on one or more parameters defining the temperature profile line; determine one or more compensation actions that modifies one or more of: the processor and the vehicle; and trigger the one or more compensation actions to be performed.

Example 21 provides the vehicle of example 20, where the one or more compensation actions includes transmitting, to a processor loading control part of the processor, a command to reduce a utilization of the processor by the one or more compute operations.

Example 22 provides the vehicle of example 20 or 21, where the one or more compensation actions includes transmitting, to a clock frequency control part of the processor, a command to lower a clock frequency of the processor.

Example 23 provides the vehicle of any one of examples 20-22, where the one or more compensation actions includes transmitting, to voltage control part of the processor, a command to lower a voltage level of the processor.

Example 24 provides the vehicle of any one of examples 20-23, where the one or more compensation actions includes after the vehicle completes a current operational assignment, transmitting a command to a vehicle cooling system of the vehicle to decrease cooling to a cabin of the vehicle and increase cooling to the processor.

Example 25 provides the vehicle of any one of examples 20-24, where the one or more compensation actions includes determining a revised route for the vehicle; and transmitting, to a vehicle behavior control part, a command to cause the vehicle to follow the revised route.

Example 26 provides one or more non-transitory computer-readable media storing instructions that, when executed by a control processor of a vehicle, cause the control processor to: receive temperature data samples of a further processor of the vehicle collected over a period of time; determine a temperature profile line that represents the temperature data samples; determine a regression profile based on one or more parameters defining the temperature profile line; based on the regression profile, determine one or more compensation actions that modifies one or more of: the further processor and the vehicle; and trigger the one or more compensation actions to be performed.

Example 27 provides the one or more non-transitory computer-readable media of example 26, where the instructions cause the control processor to further: transmit, to a fleet management system, one or more of: the regression profile, the one or more parameters defining the temperature profile line, and the one or more compensation actions.

Example 28 provides the one or more non-transitory computer-readable media of example 26 or 27 where the instructions cause the control processor to further: after the one or more compensation actions are performed, track further temperature data samples of the further processor over a further period of time; determine a further temperature profile line that envelops the temperature data samples and the further temperature data samples; and determine a further regression profile based on one or more further parameters defining the further temperature profile line.

Example 29 provides a control processor of a vehicle to execute instructions that implements a temperature tracker part, a regression profiling part, and a compensation part, where: the temperature tracker part receives temperature data samples of a further processor of the vehicle collected over a period of time; the regression profiling part determines a temperature profile line that represents the temperature data samples, and determine a regression profile based on one or more parameters defining the temperature profile line; and the compensation part, based on the regression profile, determines one or more compensation actions that modifies one or more of: the further processor and the vehicle, and trigger the one or more compensation actions to be performed.

Example 30 provides the control processor example 29, where the control processor is further to execute instructions that carries out the computer-implemented methods of one or more of examples 1-19.

Example 31 provides a computer-implemented method, including receiving one or more parameters defining a temperature profile line representative of a relationship between a temperature of a processor of a vehicle and time; determining an estimated time to a critical temperature based on a critical temperature point on the temperature profile line; determining an estimated time for the vehicle to complete a current operational assignment; and based on the estimated time to the critical temperature and the estimated time for the vehicle to complete the current operational assignment, determining one or more compensation actions to be performed by the vehicle.

Example 32 provides the computer-implemented method of example 31, where the temperature profile line relates time and temperature according to a fractional power law.

Example 33 provides the computer-implemented method of example 31, where the temperature profile line relates time and temperature according to a stretched exponential function.

Example 34 provides the computer-implemented method of any one of examples 31-33, further including after the one or more compensation actions are performed, tracking further temperature data samples of the processor over a further period of time; determining a further temperature profile line that envelops the further temperature data samples and the further temperature data samples; and determining a further estimated time to the critical temperature based on the critical temperature point on the temperature profile line.

Example 35 provides the computer-implemented method of any one of examples 31-34, where the one or more compensation actions includes changing a loading profile of the processor.

Example 36 provides the computer-implemented method of any one of examples 31-35, where the one or more compensation actions includes changing a clock frequency of the processor.

Example 37 provides the computer-implemented method of any one of examples 31-36, where the one or more compensation actions includes changing a voltage level of the processor.

Example 38 provides the computer-implemented method of any one of examples 31-37, where the one or more compensation actions includes commanding a processor cooling control of the processor to increase cooling to the processor.

Example 39 provides the computer-implemented method of any one of examples 31-38, where the one or more compensation actions includes commanding a vehicle cooling control of the vehicle to increase cooling directed to the processor.

Example 40 provides the computer-implemented method of any one of examples 31-39, where the one or more compensation actions includes changing a route of the vehicle.

Example 41 provides the computer-implemented method of any one of examples 31-40, where the one or more compensation actions includes changing a maximum speed of the vehicle.

Example 42 provides the computer-implemented method of any one of examples 31-41, where the one or more compensation actions includes causing the vehicle to enter a degraded state of operation.

Example 43 provides the computer-implemented method of any one of examples 31-42, where the one or more compensation actions includes allowing the vehicle to complete a current operational assignment; and after the vehicle completes the current operational assignment, changing a route of the vehicle.

Example 44 provides one or more non-transitory computer-readable media storing instructions that, when executed by one or more processors, cause the one or more processors to perform any one of the methods provided in examples 1-19 and 31-43.

Example 45 provides an apparatus comprising means to carry out or means for carrying out any one of the computer-implemented methods provided in examples 1-19 and 31-43.

What is claimed is:

1. A computer-implemented method, comprising:

tracking temperature data samples of a processor over a period of time, the processor being part of a vehicle;

determining a temperature profile line that envelops the temperature data samples;

determining a regression profile based on one or more parameters defining the temperature profile line, wherein determining the regression profile comprises comparing the one or more parameters defining the temperature profile line against one or more thresholds;

based on the regression profile, determining one or more compensation actions that modifies one or more of: the processor and the vehicle; and triggering the one or more compensation actions to be performed, wherein the one or more compensation actions comprises changing a loading profile of the processor.

2. The computer-implemented method of claim 1, wherein the temperature profile line relates time and temperature according to a fractional power law.

3. The computer-implemented method of claim 1, wherein determining the temperature profile line comprises:
determining a first parameter defining the temperature profile line that represents a temperature offset;
determining a second parameter defining the temperature profile line that represents a linear parameter; and
determining a third parameter defining the temperature profile line that represents a fractional power parameter.

4. The computer-implemented method of claim 1, wherein determining the regression profile comprises:
determining whether the one or more parameters defining the temperature profile line fall within a parameter value range of a plurality of parameter value ranges corresponding to different regression profiles.

5. The computer-implemented method of claim 1, wherein determining the regression profile comprises:
looking up the regression profile in a look up table using the one or more parameters defining the temperature profile line, wherein the look up table associates different characteristic values for the one or more parameters with different regression profiles.

6. The computer-implemented method of claim 1, further comprising:
determining an estimated time to a critical temperature based on a critical temperature point on the temperature profile line, wherein the determining of the one or more compensation actions is further based on the estimated time to the critical temperature.

7. The computer-implemented method of claim 1, wherein the one or more compensation actions further comprises:
changing a clock frequency of the processor.

8. The computer-implemented method of claim 1, wherein the one or more compensation actions further comprises:
changing a voltage level of the processor.

9. The computer-implemented method of claim 1, wherein the one or more compensation actions further comprises:
commanding a processor cooling control of the processor to increase cooling to the processor.

10. The computer-implemented method of claim 1, wherein the one or more compensation actions further comprises:
commanding a vehicle cooling control of the vehicle to increase cooling directed to the processor.

11. The computer-implemented method of claim 1, wherein the one or more compensation actions further comprises:
changing a route of the vehicle.

12. The computer-implemented method of claim 1, wherein the one or more compensation actions further comprises:
changing a maximum speed of the vehicle.

13. The computer-implemented method of claim 1, wherein the one or more compensation actions further comprises:
causing the vehicle to enter a degraded state of operation.

14. The computer-implemented method of claim 1, wherein the one or more compensation actions further comprises:
allowing the vehicle to complete a current operational assignment; and
after the vehicle completes the current operational assignment, changing a route of the vehicle.

15. The computer-implemented method of claim 1, further comprising:
transmitting, to a fleet management system, one or more of: the regression profile, one or more parameters defining the temperature profile line, and the one or more compensation actions.

16. The computer-implemented method of claim 1, further comprising:
after the one or more compensation actions are performed,
tracking further temperature data samples of the processor over a further period of time;
determining a further temperature profile line that envelops the further temperature data samples and the further temperature data samples; and
determining a further regression profile based on one or more further parameters defining the further temperature profile line.

17. A vehicle, comprising:
a processor to execute one or more compute operations;
a temperature sensor to sense a temperature of the processor and output temperature data samples over time; and
a control processor to:
receive the temperature data samples;
determine a temperature profile line that fits the temperature data samples;
determine a regression profile based on one or more parameters defining the temperature profile line;
determine one or more compensation actions that modifies one or more of: the processor and the vehicle; and
trigger the one or more compensation actions to be performed,
wherein the one or more compensation actions comprises:
allowing the vehicle to complete a current operational assignment; and
after the vehicle completes the current operational assignment, changing a route of the vehicle.

18. A computer-implemented method, comprising:
receiving one or more parameters defining a temperature profile line representative of a relationship between a temperature of a processor of a vehicle and time;
determining an estimated time to a critical temperature based on a critical temperature point on the temperature profile line;
determining an estimated time for the vehicle to complete a current operational assignment;
based on the estimated time to the critical temperature and the estimated time for the vehicle to complete the current operational assignment, determining one or more compensation actions to be performed by the vehicle;
triggering the one or more compensation actions to be performed,
wherein the one or more compensation actions comprises:
allowing the vehicle to complete a current operational assignment; and
after the vehicle completes the current operational assignment, changing a route of the vehicle.

* * * * *